(12) United States Patent
Nagafuchi et al.

(10) Patent No.: US 10,637,341 B2
(45) Date of Patent: Apr. 28, 2020

(54) TWO-SHAFT GAS TURBINE POWER GENERATING FACILITY AND CONTROL METHOD FOR SAME

(71) Applicant: Mitsubishi Hitachi Power Systems, Ltd., Kanagawa (JP)

(72) Inventors: Naoyuki Nagafuchi, Yokohama (JP); Toshimitsu Morimoto, Yokohama (JP); Kazuo Takahashi, Yokohama (JP); Atsushi Tsutsumi, Yokohama (JP)

(73) Assignee: MITSUBISHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/319,716

(22) PCT Filed: Jul. 21, 2017

(86) PCT No.: PCT/JP2017/026460
§ 371 (c)(1),
(2) Date: Jan. 22, 2019

(87) PCT Pub. No.: WO2018/016623
PCT Pub. Date: Jan. 25, 2018

(65) Prior Publication Data
US 2019/0280583 A1    Sep. 12, 2019

(30) Foreign Application Priority Data

Jul. 22, 2016   (JP) .................................. 2016-144230

(51) Int. Cl.
*H02K 47/04*   (2006.01)
*F02C 3/10*   (2006.01)
(Continued)

(52) U.S. Cl.
CPC ............... *H02K 47/04* (2013.01); *F02C 3/10* (2013.01); *F02C 6/00* (2013.01); *F02C 9/28* (2013.01);
(Continued)

(58) Field of Classification Search
CPC ..... F02C 3/10; F02C 6/00; F02C 9/28; H02K 7/1823; H02K 11/0094; H02K 47/04; H02P 9/04
(Continued)

(56) References Cited

U.S. PATENT DOCUMENTS

| 2005/0056021 A1 | 3/2005 | Belokon et al. |
| 2006/0150633 A1* | 7/2006 | McGinley ............... F02C 7/275 |
| | | 60/773 |

(Continued)

FOREIGN PATENT DOCUMENTS

| JP | 2007-505261 | 3/2007 |
| JP | 2013-104372 | 5/2013 |

(Continued)

OTHER PUBLICATIONS

International Search Report dated Oct. 3, 2017 in International (PCT) Application No. PCT/JP2017/026460, with English translation.

(Continued)

*Primary Examiner* — Charles Reid, Jr.
(74) *Attorney, Agent, or Firm* — Wenderoth, Lind & Ponack, L.L.P.

(57) ABSTRACT

A two-shaft gas turbine facility includes a two-shaft gas turbine, an induction motor connected to a compressor of the two-shaft gas turbine, a secondary battery, a first frequency converter that controls power transmission and reception between a power system and the induction motor, and a second frequency converter that controls charging and dis- (Continued)

charging of power between the secondary battery and the power system. A first control unit of a control device causes power transmission and reception to be performed between the induction motor and the power system by the first frequency converter if a required output change rate is higher than a maximum output change rate. A second control unit causes the secondary battery to be charged and discharged by the second frequency converter if power to be transmitted to and received from the induction motor has reached maximum allowable power.

14 Claims, 10 Drawing Sheets

(51) Int. Cl.
    *F02C 6/00*     (2006.01)
    *F02C 9/28*     (2006.01)
    *H02K 7/18*     (2006.01)
    *H02K 11/00*    (2016.01)
    *H02P 9/04*     (2006.01)

(52) U.S. Cl.
    CPC ....... *H02K 7/1823* (2013.01); *H02K 11/0094* (2013.01); *H02P 9/04* (2013.01)

(58) Field of Classification Search
    USPC .................................................. 290/50, 52
    See application file for complete search history.

(56) References Cited

U.S. PATENT DOCUMENTS

| | | | |
|---|---|---|---|
| 2010/0005808 A1* | 1/2010 | Nanataki | F02C 9/20 60/773 |
| 2010/0058731 A1* | 3/2010 | Haehner | F01D 15/08 60/39.15 |
| 2010/0180604 A1* | 7/2010 | Kawai | F23R 3/34 60/778 |
| 2013/0118146 A1 | 5/2013 | Nanataki et al. | |
| 2015/0171705 A1 | 6/2015 | Hino et al. | |
| 2015/0345385 A1* | 12/2015 | Santini | F02C 3/10 290/52 |
| 2017/0159577 A1 | 6/2017 | Hino et al. | |

FOREIGN PATENT DOCUMENTS

| | | |
|---|---|---|
| WO | 2014/002274 | 1/2014 |
| WO | 2014/020772 | 2/2014 |
| WO | 2014/155648 | 10/2014 |
| WO | 2015/181938 | 12/2015 |

OTHER PUBLICATIONS

Written Opinion of the International Searching Authority dated Oct. 3, 2017 in International (PCT) Application No. PCT/JP2017/026460, with English translation.

N. Kusumi et al., "A New Concept for Power Grid Stabilization Using a Motor-Assisted Variable Speed Gas Turbine System", Proceedings of the ASME 2014, IMECE 2014.

N. Hino et al., "A New Concept of Gas Turbine System: Motor-Assisted Gas Turbine with High-Speed Motor", IEEE 2014.

* cited by examiner

TWO-SHAFT GAS TURBINE POWER GENERATING FACILITY AND CONTROL METHOD FOR SAME

TECHNICAL FIELD

The present invention relates to a two-shaft gas turbine power generating facility including a two-shaft gas turbine and a power generator for generating electric power by driving the two-shaft gas turbine and a control method for the same.

Priority is claimed on Japanese Patent Application No. 2016-144230, filed Jul. 22, 2016, the content of which is incorporated herein by reference.

BACKGROUND ART

As a two-shaft gas turbine power generating facility, there is, for example, a facility described in the following Patent Document 1. The two-shaft gas turbine power generating facility includes a two-shaft gas turbine, a power generator, a starting motor, a secondary battery, a first frequency converter that controls power transmission/reception between the starting motor and a power system, and a second frequency converter that controls charging and discharging of power between the secondary battery and the power system.

The two-shaft gas turbine includes a compressor that compresses air to generate compressed air, a combustor that generates combustion gas by combusting fuel in the compressed air, a high-pressure turbine that is driven by combustion gas, and a low-pressure turbine that is driven by exhaust gas discharged from the high-pressure turbine. A rotor of the high-pressure turbine, the compressor rotor, and a rotor of the starting motor are mechanically connected to one another. Also, the rotor of the low-pressure turbine and the rotor of the power generator are mechanically connected to each other. However, the rotor of the high-pressure turbine and the rotor of the low-pressure turbine are not mechanically connected.

Even if the output of the power generator is increased by increasing a flow rate of the fuel to be supplied to the combustor when the required output for the two-shaft gas turbine power generating facility rapidly increases, the output of the power generator may not conform to the rapid increase in the required output. Therefore, as described in Patent Document 1, technology for temporarily employing the starting motor as a power generator to compensate for insufficiency in an output of the power generator with respect to the required output with an output from the starting motor using the power generated by the starting motor has been proposed.

The output energy of the starting motor is the rotational inertia energy of the high-pressure turbine rotor and the compressor rotor. Thus, a time required to take out the output from the starting motor is a time of about several seconds that is a significantly short time. Consequently, when the required output for the two-shaft gas turbine power generating facility rapidly increases, insufficiency in an output of the power generator for the required output may not be compensated for with the output from the starting motor using only an output based on the above-mentioned rotational inertial energy. Therefore, in the technology described in Patent Document 1, discharging of power from a secondary battery to a power system is proposed in this case.

CITATION LIST

Patent Document

Patent Document 1: PCT International Publication No. WO 2015/181938

SUMMARY OF INVENTION

Technical Problem

In a two-shaft gas turbine power generating facility, it is desired that the output conformability of the two-shaft gas turbine power generating facility with respect to a change in the required output be improved. Also, if a secondary battery is used to supplement the output of the power generator as in the two-shaft gas turbine power generating facility described in the above-mentioned Patent Document 1, it is possible to extend the lifespan by reducing the number of times the secondary battery is charged and discharged and minimizing deterioration in the performance of the secondary battery.

Therefore, an objective of the present invention is to provide technology capable of improving the output conformability of a two-shaft gas turbine power generating facility with respect to a change in a required output and extending the lifespan of a secondary battery by minimizing deterioration in the performance of the secondary battery.

Solution to Problem

As an aspect according to the invention for achieving the above-described objective, there is provided a two-shaft gas turbine power generating facility, including: a compressor having a compressor rotor and configured to generate compressed air by compressing air during rotation of the compressor rotor; a combustor configured to combust fuel in the compressed air and generate a combustion gas; a fuel adjustment valve configured to adjust a flow rate of the fuel to be supplied to the combustor; a high-pressure turbine having a high-pressure turbine rotor mechanically connected to the compressor rotor, the high-pressure turbine rotor being rotated by the combustion gas; a low-pressure turbine having a low-pressure turbine rotor disconnected from the high-pressure turbine rotor, the low-pressure turbine rotor being rotated by the combustion gas discharged from the high-pressure turbine; a power generator configured to generate power in rotation of the low-pressure turbine rotor and electrically connected to a power system through which alternating current (AC) power flows; an induction motor mechanically connected to the compressor rotor and electrically connected to the power system in parallel to the power generator; a first frequency convertor provided between the induction motor and the power system in an electrical connection relationship, configured to control power transmission and reception between the induction motor and the power system, convert a frequency of power from the induction motor into a frequency of the power system when power from the induction motor is transmitted to a power system side, and convert a frequency of power of the power system into a frequency of the induction motor when power from the power system side is received and supplied to the induction motor; a secondary battery electrically connected to the power system in parallel to the power generator and the induction motor; a second frequency converter provided between the secondary battery and the power system in an electrical connection relationship and configured to control charging and discharging of the secondary battery, convert direct current (DC) power from the secondary battery into AC power according to a frequency of the power system when the DC power from the secondary battery is discharged to the power system, and convert AC power of the power system into DC power when the secondary battery is charged with AC power from the power system; and a control device configured to control the fuel adjustment valve, the first frequency converter, and the second frequency converter. The control device includes a reception unit configured to externally receive a required output; a first determination unit configured to determine whether an absolute value of a required output change rate that is an amount of change per unit time of the required output is greater than an absolute value of a maximum output change rate that is a maximum change amount per unit time of an output of the power generator; a second determination unit configured to determine whether or not a predetermined condition has been satisfied after the first determination unit determines that the absolute value of the required output change rate is greater than the absolute value of the maximum output change rate; a fuel control unit configured to control a degree of opening of the fuel adjustment valve in accordance with a change in the required output and control the degree of opening of the fuel adjustment valve so that the output of the power generator changes at the maximum output change rate when the first determination unit determines that the absolute value of the required output change rate is greater than the absolute value of the maximum output change rate; a first control unit configured to cause power to be transmitted and received between the induction motor and the power system by the first frequency converter when the first determination unit determines that the absolute value of the required output change rate is greater than the absolute value of the maximum output change rate; and a second control unit configured to cause the secondary battery to be discharged by the second frequency converter if power is transmitted by the induction motor and cause the secondary battery to be charged by the second frequency converter if power is received by the induction motor when the second determination unit determines that the predetermined condition has been satisfied. The predetermined condition is that power to be transmitted and received by the induction motor becomes maximum allowable power determined for the induction motor or a rotational speed of the compressor rotor becomes a limit in a switching rotational speed range narrower than an allowable rotational speed range of the compressor.

In the two-shaft gas turbine power generating facility, when the absolute value of the required output change rate is greater than the absolute value of the maximum output change rate, the degree of opening of the fuel adjustment valve is controlled so that the output of the power generator changes at the maximum output change rate. Further, power transmission and reception are started between the induction motor and the power system by the first frequency converter. Thus, in the two-shaft gas turbine power generating facility, it is possible to compensate for at least a part of insufficiency in a change in the output of the power generator for the required output change with power transmission and reception between the induction motor and the power system.

Also, in the two-shaft gas turbine power generating facility, when the absolute value of the required output change rate is greater than the absolute value of the maximum output change rate, the secondary battery is charged and discharged after the power to be transmitted and received by the induction motor becomes the maximum allowable power or the rotational speed of the compressor rotor becomes the limit in the switching rotational speed range. That is, in the two-shaft gas turbine power generating facility, the secondary battery is not immediately charged and discharged even when the absolute value of the required output change rate is greater than the absolute value of the maximum output change rate. Consequently, in the two-shaft gas turbine power generating facility, it is possible to decrease the number of times the secondary battery is charged and discharged and minimize deterioration in the performance of the secondary battery.

Further, in the two-shaft gas turbine power generating facility, when the absolute value of the required output change rate is greater than the absolute value of the maximum output change rate, the secondary battery is charged and discharged if the power to be transmitted and received by the induction motor becomes the maximum allowable power or the rotational speed of the compressor rotor becomes the limit in the switching rotational speed range while the power is transmitted and received by the induction motor. That is, in the two-shaft gas turbine power generating facility, the secondary battery is charged and discharged during power transmission and reception of the induction motor. In other words, in the two-shaft gas turbine power generating facility, a time zone of power transmission and reception of the induction motor partially overlaps a time zone of charging and discharging of the secondary battery.

Consequently, in the two-shaft gas turbine power generating facility, continuity of power transmission and reception for the power system is secured by the power transmission and reception of the induction motor and the charging and discharging of the secondary battery. Thus, it is possible to improve the output conformability of the two-shaft gas turbine power generating facility with respect to a change in the required output even when the absolute value of the required output change rate is greater than the absolute value of the maximum output change rate in the two-shaft gas turbine power generating facility.

Here, in the two-shaft gas turbine power generating facility, the first control unit may cause an amount of power to be transmitted to and received from the induction motor to be increased by the first frequency converter until the second determination unit determines that the predetermined condition has been satisfied after the first determination unit determines that the absolute value of the required output change rate is greater than the absolute value of the maximum output change rate and may cause the amount of power to be transmitted to and received from the induction motor to be decreased by the first frequency converter when the second determination unit determines that the predetermined condition has been satisfied.

In the two-shaft gas turbine power generating facility, because an amount of power transmission/reception for the induction motor increases during a period in which the second determination unit determines that the condition has been satisfied after the first determination unit determines that the absolute value of the required output change rate is greater than the absolute value of the maximum output change rate, it is possible to improve the output conformability of the two-shaft gas turbine power generating facility for the required output change during the period.

Also, in the two-shaft gas turbine power generating facility, when the second determination unit determines that the condition has been satisfied, an amount of power transmission/reception for the induction motor decreases. Because charging and discharging by the secondary battery are started when the second determination unit determines that the condition has been satisfied, the output conformability of the two-shaft gas turbine power generating facility with respect to a change in the required output are not degraded even when the power transmission and reception for the induction motor decrease.

An energy source of the power to be transmitted and received by the induction motor is rotational inertial energy of the compressor rotor and the high-pressure turbine rotor. Thus, when power is transmitted from the induction motor to the power system, the rotational speeds of the compressor rotor and the high-pressure turbine rotor decrease and approach an allowable lower limit rotational speed determined for the rotors. On the other hand, when the first frequency converter receives the power of the power system and supplies the received power to the induction motor, the rotational speeds of the compressor rotor and the high-pressure turbine rotor increase and approach an allowable upper limit rotational speed determined for the rotors. Also, the allowable rotational speed range is determined by the allowable lower limit rotational speed and the allowable upper limit rotational speed.

In the two-shaft gas turbine power generating facility, as described above, when the second determination unit determines that the condition has been satisfied, an amount of power transmission/reception for the induction motor decreases. Thus, in the two-shaft gas turbine power generating facility, it is possible to decrease a speed at which the rotational speeds of the compressor rotor and the high-pressure turbine rotor approach the limit in the allowable rotational speed range.

In the two-shaft gas turbine power generating facility according to either one described above, the control device may include a third determination unit configured to determine whether or not the rotational speed of the compressor rotor has reached the limit in the allowable rotational speed range, and the first control unit may cause power transmission and reception to and from the induction motor by the first frequency converter to be stopped when the third determination unit determines that the rotational speed of the compressor rotor has reached the limit in the allowable rotational speed range after the power transmission and reception to and from the induction motor are started by the first frequency converter.

When power is transmitted and received by the induction motor, the rotational speeds of the compressor rotor and the high-pressure turbine rotor increase and approach a limit within an allowable rotational speed range as described above. In the gas turbine power generating facility, a change in the rotational speed is stopped because power transmission and reception for the induction motor are stopped when the rotational speed of the compressor rotor reaches the limit within the allowable rotational speed range.

Also, in the two-shaft gas turbine power generating facility according to any one described above, the control device may include a fourth determination unit configured to determine whether or not the rotational speed of the compressor has returned to an immediately previous rotational speed at which power transmission and reception to and from the induction motor are started after the power transmission and reception to and from the induction motor are started by the first frequency converter; and a fifth determination unit configured to determine whether or not a positive or negative sign of a required output change rate of a previously required output is opposite to a positive or negative sign of a required output change rate of a newly required output after the first determination unit determines that an absolute value of the required output change rate of the newly required output is greater than an absolute value of the maximum output change rate wherein the newly required output is received by the reception unit after the power transmission and reception to and from the induction motor are started by the first frequency converter and before the fourth determination unit determines that the rotational speed of the compressor has returned to the immediately previous rotational speed at which the power transmission and reception to and from the induction motor are started, if the fifth determination unit determines that the positive or negative sign of the required output change rate of the previously required output is the same as the positive or negative sign of the required output change rate of the newly required output, the fuel control unit may control the degree of opening of the fuel adjustment valve so that the output of the power generator changes at the maximum output change rate in accordance with the newly required output, the first control unit may cause power transmission and reception to continue between the induction motor and the power system in accordance with the previously required output by the first frequency converter or cause the power transmission and reception to be stopped if power is transmitted and received between the induction motor and the power system in accordance with the previously required output, and the second control unit may cause charging and discharging of the secondary battery according to the previously required output by the second frequency converter to be continued or cause the charging and discharging to be stopped if the secondary battery is charged and discharged in accordance with the previously required output.

If the positive or negative sign of the required output change rate of the previously required output is the same as the positive or negative sign of the required output change rate of the newly required output, the charge percentage of the secondary battery is further away from the reference charge percentage after the rotational speed of the compressor reaches the limit of the allowable rotational speed range for a significantly short time when a process similar to a process on the previously required output is executed in a step in which the rotational speed of the compressor does not return to the original rotational speed according to a process on the previously required output. Thus, in the two-shaft gas turbine power generating facility, if the positive or negative sign of the required output change rate of the previously required output is the same as the positive or negative sign of the required output change rate of the newly required output, a process similar to a process on the previously required output is not executed in a step in which the rotational speed of the compressor does not return to the original rotational speed according to a process on the previously required output.

In the two-shaft gas turbine power generating facility having the fifth determination unit, if the fifth determination unit determines that the positive or negative sign of the required output change rate of the previously required output is opposite to the positive or negative sign of the required output change rate of the newly required output, the fuel control unit may control the degree of opening of the fuel adjustment valve so that the output of the power generator changes at the maximum output change rate in accordance with the newly required output, the first control unit may cause power transmission and reception to be started between the induction motor and the power system in accordance with the previously required output by the first frequency converter, and the second control unit may cause the secondary battery to be discharged by the second frequency converter if power is transmitted by the induction motor and cause the secondary battery to be charged by the second frequency converter if power is received by the induction motor when the second determination unit determines that the predetermined condition has been satisfied.

If the positive or negative sign of the required output change rate of the previously required output is opposite to the positive or negative sign of the required output change rate of the newly required output, when an opposite process on the previously required output is executed in a step in which the rotational speed of the compressor does not return to the original rotational speed according to a process on the previously required output, the opposite process acts in a direction in which the charge percentage of the secondary battery approaches the reference charge percentage after acting in a direction in which the rotational speed of the compressor returns to the original rotational speed. Thus, in the two-shaft gas turbine power generating facility, if the positive or negative sign of the required output change rate of the previously required output is opposite to the positive or negative sign of the required output change rate of the newly required output, an opposite process on the previously required output is executed also in a step in which the rotational speed of the compressor does not return to the original rotational speed according to a process on the previously required output.

In the two-shaft gas turbine power generating facility according to any one described above, the control device may include a charge percentage estimation unit configured to estimate a charge percentage of the secondary battery; and a sixth determination unit configured to determine whether the charge percentage of the secondary battery estimated by the charge percentage estimation unit is lower than a set low charge percentage lower than a reference charge percentage and is higher than a set high charge percentage higher than the reference charge percentage, and the second control unit may cause the secondary battery to be charged by the second frequency converter when the sixth determination unit determines that the charge percentage of the secondary battery is lower than the set low charge percentage and the first determination unit determines that a negative required output change rate is higher than a negative maximum output change rate and cause the secondary battery to be discharged by the second frequency converter when the sixth determination unit determines that the charge percentage of the secondary battery is higher than the set high charge percentage and the first determination unit determines that a positive required output change rate is lower than a positive maximum output change rate.

In the two-shaft gas turbine power generating facility, if the charge percentage of the secondary battery is lower than the set low charge percentage, when the first determination unit determines that the negative required output change rate is higher than the negative maximum output change rate, i.e., when the required output is shown to decrease but a change in the decrease is slow, the secondary battery is charged by the second frequency converter. Also, in the two-shaft gas turbine power generating facility, if the charge percentage of the secondary battery is higher than the set high charge percentage, when the first determination unit determines that the positive required output change rate is lower than the positive maximum output change rate, i.e., when the required output is shown to increase but a change in the decrease is slow, the secondary battery is discharged by the second frequency converter.

That is, in the two-shaft gas turbine power generating facility, if the charge percentage of the secondary battery is low and the required output slowly decreases, the secondary battery is charged by the second frequency converter. Also, in the two-shaft gas turbine power generating facility, if the charge percentage of the secondary battery is high and the required output slowly increases, the secondary battery is discharged by the second frequency converter. Consequently, in the two-shaft gas turbine power generating facility, it is possible to make the charge percentage of the secondary battery close to the reference charge percentage without causing the facility to perform an unreasonable operation even when the charge percentage of the secondary battery is away from the reference charge percentage.

As another aspect according to the invention for achieving the above-described objective, there is provided a two-shaft gas turbine power generating facility, including: a compressor having a compressor rotor and configured to generate compressed air by compressing air during rotation of the compressor rotor; a combustor configured to combust fuel in the compressed air and generate a combustion gas; a fuel adjustment valve configured to adjust a flow rate of the fuel to be supplied to the combustor; a high-pressure turbine having a high-pressure turbine rotor mechanically connected to the compressor rotor, the high-pressure turbine rotor being rotated by the combustion gas; a low-pressure turbine having a low-pressure turbine rotor disconnected from the high-pressure turbine rotor, the low-pressure turbine rotor being rotated by the combustion gas discharged from the high-pressure turbine; a power generator configured to generate power in rotation of the low-pressure turbine rotor and electrically connected to a power system through which alternating current (AC) power flows; an induction motor mechanically connected to the compressor rotor and electrically connected to the power system in parallel to the power generator; a first frequency convertor provided between the induction motor and the power system in an electrical connection relationship, configured to control power transmission and reception between the induction motor and the power system, convert a frequency of power from the induction motor into a frequency of the power system when power from the induction motor is transmitted to a power system side, and convert a frequency of power of the power system into a frequency of the induction motor when power from the power system side is received and supplied to the induction motor; a secondary battery electrically connected to the power system in parallel to the power generator and the induction motor; a second frequency converter provided between the secondary battery and the power system in an electrical connection relationship, configured to control charging and discharging of the secondary battery, convert direct current (DC) power from the secondary battery into AC power according to a frequency of the power system when the DC power from the secondary battery is discharged to the power system, and convert AC power of the power system into DC power when the secondary battery is charged with AC power from the power system; and a control device configured to control the fuel adjustment valve, the first frequency converter, and the second frequency converter. The control device includes a reception unit configured to externally receive a required output; a first determination unit configured to determine whether an absolute value of a required output change rate that is an amount of change per unit time of the required output is greater than an absolute value of a maximum output change rate that is a maximum change amount per unit time of an output of the power generator; a fuel control unit configured to control a degree of opening of the fuel adjustment valve in accordance with a change in the required output and control the degree of opening of the fuel adjustment valve so that the output of the power generator changes at the maximum output change rate when the first determination unit determines that the absolute value of the required output change rate is greater than the absolute value of the maximum output change rate; a first control unit configured to cause power to be transmitted and received between the induction motor and the power system by the first frequency converter when the first determination unit determines that the absolute value of the required output change rate is greater than the absolute value of the maximum output change rate; a second control unit configured to cause the secondary battery to be discharged by the second frequency converter if power is transmitted by the induction motor and cause the secondary battery to be charged by the second frequency converter if power is received by the induction motor when at least a condition that the first determination unit determines that the absolute value of the required output change rate is greater than the absolute value of the maximum output change rate is provided and the condition has been satisfied; a charge percentage estimation unit configured to estimate a charge percentage of the secondary battery; and a sixth determination unit configured to determine whether the charge percentage of the secondary battery estimated by the charge percentage estimation unit is lower than a set low charge percentage lower than a reference charge percentage and is higher than a set high charge percentage higher than the reference charge percentage. The second control unit causes the secondary battery to be charged by the second frequency converter when the sixth determination unit determines that the charge percentage of the secondary battery is lower than the set low charge percentage and the first determination unit determines that a negative required output change rate is higher than a negative maximum output change rate and causes the secondary battery to be discharged by the second frequency converter when the sixth determination unit determines that the charge percentage of the secondary battery is higher than the set high charge percentage and the first determination unit determines that a positive required output change rate is lower than a positive maximum output change rate.

In the two-shaft gas turbine power generating facility, if the charge percentage of the secondary battery is low and the required output slowly decreases, the secondary battery is charged by the second frequency converter. Also, in the two-shaft gas turbine power generating facility, if the charge percentage of the secondary battery is high and the required output slowly increases, the secondary battery is discharged by the second frequency converter. Consequently, in the two-shaft gas turbine power generating facility, it is possible to make the charge percentage of the secondary battery close to the reference charge percentage without causing the facility to perform an unreasonable operation even when the charge percentage of the secondary battery is away from the reference charge percentage.

The two-shaft gas turbine power generating facility having the charge percentage estimation unit includes a thermometer configured to detect temperature of air suctioned by the compressor, wherein the control device may include a seventh determination unit configured to determine whether the temperature detected by the thermometer is higher than a first temperature higher than a design temperature of the air suctioned by the compressor and whether the temperature detected by the thermometer is lower than a second temperature lower than the design temperature, wherein the sixth determination unit may determine whether the charge percentage of the secondary battery estimated by the charge percentage estimation unit is lower than the reference charge percentage and is higher than the reference charge percentage, wherein, when the sixth determination unit determines that the charge percentage of the secondary battery estimated by the charge percentage estimation unit is lower than the reference charge percentage and the seventh determination unit determines that the temperature of the air suctioned by the compressor is lower than the second temperature, the first control unit may transmit power from the induction motor to the power system and the second control unit may cause the secondary battery to be charged by the second frequency converter so that the rotational speed of the compressor does not fall outside the allowable rotational speed range by the first frequency converter, and wherein. when the sixth determination unit determines that the charge percentage of the secondary battery estimated by the charge percentage estimation unit is higher than the reference charge percentage and the seventh determination unit determines that the temperature of the air suctioned by the compressor is higher than the first temperature, the first control unit may supply power from the power system to the induction motor and the second control unit may cause the secondary battery to be discharged by the second frequency converter so that the rotational speed of the compressor does not fall outside the allowable rotational speed range by the first frequency converter.

When the temperature of the air suctioned by the compressor is high, the gas turbine output, i.e., the output of the power generator, decreases because a mass flow rate of the air flowing into the gas turbine decreases. In contrast, when the temperature of the air suctioned by the compressor is low, the gas turbine output, i.e., the output of the power generator, increases because the mass flow rate of the air flowing into the gas turbine increases.

Therefore, in the two-shaft gas turbine power generating facility, when the temperature of the air suctioned by the compressor is high, the power of the secondary battery is discharged, the induction motor is driven using this power, and driving of the compressor is assisted by this induction motor. Consequently, in the two-shaft gas turbine power generating facility, even when the temperature of the air suctioned by the compressor is high, it is possible to minimize a decrease in the output of the power generator. Also, in the two-shaft gas turbine power generating facility, when the temperature of the air suctioned by the compressor is low and a maximum value of the output of the power generator is limited, the induction motor is driven by the compressor, i.e., the driving of the compressor is assisted to the negative side by the induction motor, power from the induction motor is transmitted to the power system, and the secondary battery is charged with the power. Consequently, in this case, in the two-shaft gas turbine power generating facility, it is possible to minimize an increase in the output of the power generator.

In the two-shaft gas turbine power generating facility having the thermometer, the reception unit may receive a forecast of temperature of air suctioned by the compressor, and the control device may include an eighth determination unit configured to determine whether the forecast temperature of the air suctioned by the compressor after a predetermined time is higher than a first temperature higher than a design temperature of the air suctioned by the compressor and whether the forecast temperature of the air suctioned by the compressor after the predetermined time is lower than a second temperature lower than the design temperature; and a reference change unit configured to increase the reference charge percentage when the eighth determination unit determines that the forecast temperature of the air suctioned by the compressor after the predetermined time is higher than the first temperature and decrease the reference charge percentage when the eighth determination unit determines that the forecast temperature of the air suctioned by the compressor after the predetermined time is lower than the second temperature.

In the two-shaft gas turbine power generating facility, when the temperature of the air suctioned by the compressor is high and the driving of the compressor is assisted by the induction motor by causing the secondary battery to be discharged, it is possible to increase the charge percentage of the secondary battery in advance. Also, in the two-shaft gas turbine power generating facility, when the temperature of the air suctioned by the compressor is low and the driving of the compressor is assisted to the negative side by the induction motor by causing the secondary battery to be charged, it is possible to decrease the charge percentage of the secondary battery in advance.

In the two-shaft gas turbine power generating facility according to any one described above having the charge percentage estimation unit, the sixth determination unit may determine whether the charge percentage of the secondary battery estimated by the charge percentage estimation unit is higher than the set low charge percentage and is lower than the set high charge percentage, the control device may include a ninth determination unit configured to determine whether the required output is lower than a set low output lower than a rated output related to the power generator and whether the required output is lower than the rated output and is higher than a set high output higher than the set low output, when the ninth determination unit determines that the required output is lower than the set low output, the sixth determination unit determines that the charge percentage of the secondary battery is lower than the set high charge percentage, and the first determination unit determines that a negative required output change rate is higher than a negative maximum output change rate, the second control unit may cause the secondary battery to be charged by the second frequency converter and the fuel control unit may control the degree of opening of the fuel adjustment valve so that the output of the power generator becomes a value obtained by summing the required output and power with which the secondary battery is charged by the second frequency converter, and, when the ninth determination unit determines that the required output is higher than the set low output, the sixth determination unit determines that the charge percentage of the secondary battery is higher than the set low charge percentage, and the first determination unit determines that a positive required output change rate is lower than a positive maximum output change rate, the second control unit may cause the secondary battery to be discharged by the second frequency converter and the fuel control unit may control the degree of opening of the fuel adjustment valve so that the output of the power generator becomes a value obtained by subtracting power with which the secondary battery is discharged by the second frequency converter from the required output.

In the two-shaft gas turbine power generating facility, even when the required output is lower than the set low output, it is possible to minimize a decrease in a flow rate to be supplied to the combustor and it is possible to stably operate a fuel system, a system through which combustion gas flows, and the like. Also, in the two-shaft gas turbine power generating facility, even when the required output is higher than the set high output, it is possible to minimize an increase in a flow rate to be supplied to the combustor and it is possible to stably operate a fuel system, a system through which combustion gas flows, and the like.

As an aspect according to the invention for achieving the above-described objective, there is provided a control method for a two-shaft gas turbine power generating facility including a compressor having a compressor rotor and configured to generate compressed air by compressing air during rotation of the compressor rotor; a combustor configured to combust fuel in the compressed air and generate a combustion gas; a fuel adjustment valve configured to adjust a flow rate of the fuel to be supplied to the combustor; a high-pressure turbine having a high-pressure turbine rotor mechanically connected to the compressor rotor, the high-pressure turbine rotor being rotated by the combustion gas; a low-pressure turbine having a low-pressure turbine rotor disconnected from the high-pressure turbine rotor, the low-pressure turbine rotor being rotated by the combustion gas discharged from the high-pressure turbine; a power generator configured to generate power in rotation of the low-pressure turbine rotor and electrically connected to a power system through which AC power flows; an induction motor mechanically connected to the compressor rotor and electrically connected to the power system in parallel to the power generator; a first frequency convertor provided between the induction motor and the power system in an electrical connection relationship, configured to control power transmission and reception between the induction motor and the power system, convert a frequency of power from the induction motor into a frequency of the power system when power from the induction motor is transmitted to a power system side, and convert a frequency of power of the power system into a frequency of the induction motor when power from the power system side is received and supplied to the induction motor; a secondary battery electrically connected to the power system in parallel to the power generator and the induction motor; and a second frequency converter provided between the secondary battery and the power system in an electrical connection relationship and configured to control charging and discharging of the secondary battery, convert DC power from the secondary battery into AC power according to a frequency of the power system when the DC power from the secondary battery is discharged to the power system, and convert AC power of the power system into DC power when the secondary battery is charged with AC power from the power system.

The control method includes a reception process of externally receiving a required output; a first determination process of determining whether an absolute value of a required output change rate that is an amount of change per unit time of the required output is greater than an absolute value of a maximum output change rate that is a maximum change amount per unit time of an output of the power generator; a second determination process of determining whether or not a predetermined condition has been satisfied after it is determined that the absolute value of the required output change rate is greater than the absolute value of the maximum output change rate in the first determination process; a fuel control process of controlling a degree of opening of the fuel adjustment valve in accordance with a change in the required output and controlling the degree of opening of the fuel adjustment valve so that the output of the power generator changes at the maximum output change rate when it is determined that the absolute value of the required output change rate is greater than the absolute value of the maximum output change rate in the first determination process; a first control process of causing power transmission and reception between the induction motor and the power system by the first frequency converter to be started when it is determined that the absolute value of the required output change rate is greater than the absolute value of the maximum output change rate in the first determination process; and a second control process of causing the secondary battery to be discharged by the second frequency converter if power is transmitted by the induction motor and causing the secondary battery to be charged by the second frequency converter if power is received by the induction motor when it is determined that the predetermined condition has been satisfied in the second determination process. The predetermined condition is that power to be transmitted and received by the induction motor becomes maximum allowable power determined for the induction motor or a rotational speed of the compressor rotor becomes a limit in a switching rotational speed range narrower than an allowable rotational speed range of the compressor rotor.

Here, in the control method for the two-shaft gas turbine power generating facility, the first control process may include increasing an amount of power to be transmitted to and received from the induction motor by the first frequency converter until it is determined that the predetermined condition has been satisfied in the second determination process after it is determined that the absolute value of the required output change rate is greater than the absolute value of the maximum output change rate in the first determination process and decreasing an amount of power to be transmitted to and received from the induction motor by the first frequency converter when it is determined that the predetermined condition has been satisfied in the second determination process.

Also, the control method for the two-shaft gas turbine power generating facility according to either one described above may include a third determination process of determining whether or not the rotational speed of the compressor rotor has reached the limit in the allowable rotational speed range, wherein power transmission and reception to and from the induction motor by the first frequency converter may be stopped in the first control process when it is determined that the rotational speed of the compressor rotor has reached the limit in the allowable rotational speed range in the third determination process after the power transmission and reception to and from the induction motor are started by the first frequency converter.

The control method for the two-shaft gas turbine power generating facility according to any one described above may include a charge percentage estimation process of estimating a charge percentage of the secondary battery; and a sixth determination process of determining whether the charge percentage of the secondary battery estimated in the charge percentage estimation process is lower than a set low charge percentage lower than a reference charge percentage and is higher than a set high charge percentage higher than the reference charge percentage, wherein the secondary battery may be charged by the second frequency converter in the second control process when it is determined that the charge percentage of the secondary battery is lower than the set low charge percentage in the sixth determination process and it is determined that a negative required output change rate is higher than a negative maximum output change rate in the first determination process and causing the secondary battery to be discharged by the second frequency converter when it is determined that the charge percentage of the secondary battery is higher than the set high charge percentage in the sixth determination process and it is determined that a positive required output change rate is lower than a positive maximum output change rate in the first determination process.

As another aspect according to the invention for achieving the above-described objective, there is provided a control method for a two-shaft gas turbine power generating facility including a compressor having a compressor rotor and configured to generate compressed air by compressing air during rotation of the compressor rotor; a combustor configured to combust fuel in the compressed air and generate a combustion gas; a fuel adjustment valve configured to adjust a flow rate of the fuel to be supplied to the combustor; a high-pressure turbine having a high-pressure turbine rotor mechanically connected to the compressor rotor, the high-pressure turbine rotor being rotated by the combustion gas; a low-pressure turbine having a low-pressure turbine rotor disconnected from the high-pressure turbine rotor, the low-pressure turbine rotor being rotated by the combustion gas discharged from the high-pressure turbine; a power generator configured to generate power in rotation of the low-pressure turbine rotor and electrically connected to a power system through which AC power flows; an induction motor mechanically connected to the compressor rotor and electrically connected to the power system in parallel to the power generator; a first frequency convertor provided between the induction motor and the power system in an electrical connection relationship, configured to control power transmission and reception between the induction motor and the power system, convert a frequency of power from the induction motor into a frequency of the power system when power from the induction motor is transmitted to a power system side, and convert a frequency of power of the power system into a frequency of the induction motor when power from the power system side is received and supplied to the induction motor; a secondary battery electrically connected to the power system in parallel to the power generator and the induction motor; and a second frequency converter provided between the secondary battery and the power system in an electrical connection relationship and configured to control charging and discharging of the secondary battery, convert DC power from the secondary battery into AC power according to a frequency of the power system when the DC power from the secondary battery is discharged to the power system, and convert AC power of the power system into DC power when the secondary battery is charged with AC power from the power system.

The control method includes a reception process of externally receiving a required output; a first determination process of determining whether an absolute value of a required output change rate that is an amount of change per unit time of the required output is greater than an absolute value of a maximum output change rate that is a maximum change amount per unit time of an output of the power generator; a fuel control process of controlling a degree of opening of the fuel adjustment valve in accordance with a change in the required output and control the degree of opening of the fuel adjustment valve so that the output of the power generator changes at the maximum output change rate when it is determined that the absolute value of the required output change rate is greater than the absolute value of the maximum output change rate in the first determination process; a first control process configured to cause power transmission and reception between the induction motor and the power system by the first frequency converter to be started when it is determined that the absolute value of the required output change rate is greater than the absolute value of the maximum output change rate in the first determination process; a second control process of causing the secondary battery to be discharged by the second frequency converter if power is transmitted by the induction motor and causing the secondary battery to be charged by the second frequency converter if power is received by the induction motor when at least a condition that it is determined that the absolute value of the required output change rate is greater than the absolute value of the maximum output change rate in the first determination process is provided and the condition has been satisfied; a charge percentage estimation process of estimating a charge percentage of the secondary battery; and a sixth determination process of determining whether the charge percentage of the secondary battery estimated in the charge percentage estimation process is lower than a set low charge percentage lower than a reference charge percentage and is higher than a set high charge percentage higher than the reference charge percentage. The second control process includes causing the secondary battery to be charged by the second frequency converter when it is determined that the charge percentage of the secondary battery is lower than the set low charge percentage in the sixth determination process and it is determined that a negative required output change rate is higher than a negative maximum output change rate in the first determination process and causing the secondary battery to be discharged by the second frequency converter when it is determined that the charge percentage of the secondary battery is higher than the set high charge percentage in the sixth determination process and it is determined that a positive required output change rate is lower than a positive maximum output change rate in the first determination process.

In the two-shaft gas turbine power generating facility for executing the charge percentage estimation process, the control method includes a temperature detection process of detecting a temperature of air suctioned by the compressor and a seventh determination process of determining whether the temperature detected in the temperature detection process is higher than a first temperature higher than a design temperature of the air suctioned by the compressor and whether the temperature detected in the temperature detection process is lower than a second temperature lower than the design temperature, wherein it may be determined whether the charge percentage of the secondary battery estimated in the charge percentage estimation process is lower than the reference charge percentage and is higher than the reference charge percentage in the sixth determination process, wherein, when it is determined that the charge percentage of the secondary battery estimated in the charge percentage estimation process is lower than the reference charge percentage in the sixth determination process and it is determined that the temperature of the air suctioned by the compressor is lower than the second temperature in the seventh determination process, power may be transmitted from the induction motor to the power system in the first control process and the secondary battery may be charged by the second frequency converter so that the rotational speed of the compressor does not fall outside the allowable rotational speed range by the first frequency converter in the second control process, and wherein, when it is determined that the charge percentage of the secondary battery estimated by the charge percentage estimation unit is higher than the reference charge percentage in the sixth determination process and it is determined that the temperature of the air suctioned by the compressor is higher than the first temperature in the seventh determination process, power may be supplied from the power system to the induction motor in the first control process and the secondary battery may be discharged by the second frequency converter so that the rotational speed of the compressor does not fall outside the allowable rotational speed range by the first frequency converter in the second control process.

In the control method for the two-shaft gas turbine power generating facility including the charge percentage estimation process, a forecast of a temperature of air suctioned by the compressor may be received in the reception process, and the control method may include an eighth determination process of determining whether the forecast temperature of the air suctioned by the compressor after a predetermined time is higher than a first temperature higher than a design temperature of the air suctioned by the compressor and whether the forecast temperature of the air suctioned by the compressor after the predetermined time is lower than a second temperature lower than the design temperature; and a reference change process of increasing the reference charge percentage when it is determined that the forecast temperature of the air suctioned by the compressor after the predetermined time is higher than the first temperature in the eighth determination process and decreasing the reference charge percentage when it is determined that the forecast temperature of the air suctioned by the compressor after the predetermined time is lower than the second temperature in the eighth determination process.

In the control method for the two-shaft gas turbine power generating facility according to any one described above including the charge percentage estimation process, it is determined whether the charge percentage of the secondary battery estimated by the charge percentage estimation unit is higher than the set low charge percentage and is lower than the set high charge percentage in the sixth determination process, the control method may include a ninth determination process of determining whether the required output is lower than a set low output lower than a rated output related to the power generator and whether the required output is lower than the rated output and is higher than a set high output higher than the set low output, when it is determined that the required output is lower than the set low output in the ninth determination process, it is determined that the charge percentage of the secondary battery is lower than the set high charge percentage in the sixth determination process, and it is determined that a negative required output change rate is higher than a negative maximum output change rate in the first determination process, the secondary battery may be charged by the second frequency converter in the second control process and the degree of opening of the fuel adjustment valve may be controlled so that the output of the power generator becomes a value obtained by summing the required output and power with which the secondary battery is charged by the second frequency converter in the fuel control process, and, when it is determined that the required output is higher than the set low output in the ninth determination process, it is determined that the charge percentage of the secondary battery is higher than the set low charge percentage in the sixth determination process, and it is determined that a positive required output change rate is lower than a positive maximum output change rate in the first determination process, the secondary battery may be discharged by the second frequency converter in the second control process and the degree of opening of the fuel adjustment valve may be controlled so that the output of the power generator becomes a value obtained by subtracting power with which the secondary battery is discharged by the second frequency converter from the required output in the fuel control process.

Advantageous Effects of Invention

According to an aspect of the present invention, it is possible to improve the output conformability of a two-shaft gas turbine power generating facility with respect to a change in a required output and extend the lifespan of a secondary battery by minimizing deterioration in the performance of the secondary battery.

DESCRIPTION OF EMBODIMENTS

Hereinafter, an embodiment of a two-shaft gas turbine power generating facility according to the present invention will be described in detail with reference to the drawings.

Figure 1:
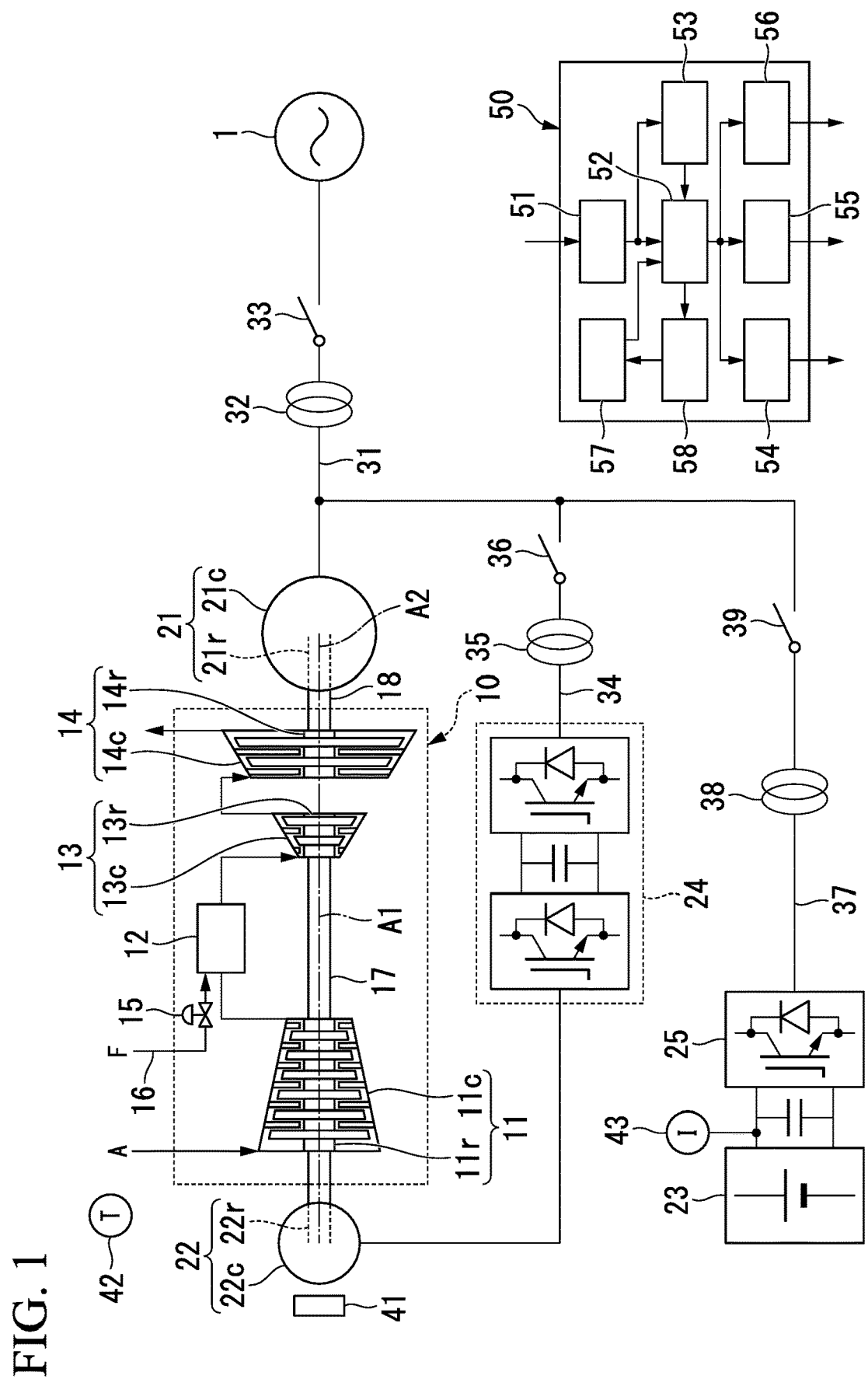
FIG. 1 is a system diagram of a two-shaft gas turbine power generating facility according to an embodiment of the present invention.

As shown in FIG. 1, the two-shaft gas turbine power generating facility of the present embodiment includes a two-shaft gas turbine 10, a power generator 21, an induction motor 22, a secondary battery 23, a first frequency converter 24 that controls power transmission/reception between the induction motor 22 and a power system 1, a second frequency converter 25 that controls charging and discharging of the secondary battery 23, and a control device 50.

The two-shaft gas turbine 10 includes a compressor 11 configured to generate compressed air by compressing air A, a combustor 12 configured to generate combustion gas by combusting fuel F in the compressed air, a fuel adjustment valve 15 configured to adjust a flow rate of the fuel F to be supplied to the combustor 12, a high-pressure turbine 13 that is driven by the combustion gas from the combustor 12, and a low-pressure turbine 14 that is driven by the combustion gas discharged from the high-pressure turbine 13.

The compressor 11 includes a compressor rotor 11r configured to rotate about a first shaft line A1 and a compressor casing 11c with which the compressor rotor 11r is covered. The high-pressure turbine 13 has a high-pressure turbine rotor 13r configured to rotate about the first shaft line A1 and a high-pressure turbine casing 13c configured to cover the high-pressure turbine rotor 13r. Both the compressor rotor 11r and the high-pressure turbine rotor 13r are positioned on the first shaft line A1 and are connected to each other to constitute a first rotor 17. The low-pressure turbine 14 includes a low-pressure turbine rotor 14r configured to rotate around a second shaft line A2 and a low-pressure turbine casing 14c with which the low-pressure turbine rotor 14r is covered. The combustor 12 is connected to a fuel supply source through a fuel line 16. The fuel adjustment valve 15 is provided in the fuel line 16.

The induction motor 22 has a motor rotor 22r configured to rotate around the first shaft line A1 and a motor casing 22c with which the motor rotor 22r is covered. The motor rotor 22r is mechanically directly connected to the first rotor 17. It is only necessary to mechanically connect the motor rotor 22r to the first rotor 17. For example, the motor rotor 22r may be mechanically connected to the first rotor 17 via a speed reducer.

The power generator 21 has a power generator rotor 21r configured to rotate about the second shaft line A2 and a power generator casing 21c configured to cover the power generator rotor 21r. The power generator 21 is a synchronous power generator. Both the power generator rotor 21r and the low-pressure turbine rotor 14r are positioned on the second shaft line A2 and are connected to each other to constitute a second rotor 18. The second rotor 18 is not connected to the first rotor 17. Therefore, the second rotor 18 can rotate independently of the rotation of the first rotor 17.

The power generator 21 is electrically connected to the power system 1 through a main power path 31. A transformer 32 and a circuit breaker 33 are provided in the main power path 31. The induction motor 22 is electrically connected to the power system 1 through a sub-power path 34 in parallel to the power generator 21. The sub-power path 34 is connected to a position between the power generator 21 and the transformer 32 in the main power path 31. A first frequency converter 24, a transformer 35 and a circuit breaker 36 are provided in the sub-power path 34. The transformer 35 and the circuit breaker 36 are provided closer to the main power path side than the first frequency converter 24 is. A second frequency converter 25 is electrically connected to the secondary battery 23. The second frequency converter 25 is electrically connected to the power system 1 through a charging and discharging path 37 in parallel to the power generator 21 and the induction motor 22. Consequently, the secondary battery 23 is electrically connected to the power system 1 in parallel to the power generator 21 and the induction motor 22. Similar to the sub-power path 34, the charging and discharging path 37 is also connected to a position between the power generator 21 and the transformer 32 in the main power path 31. A transformer 38 and a circuit breaker 39 are provided in the charging and discharging path 37.

The first frequency converter 24 converts a frequency of the induction motor 22 into a frequency of the power system 1 when power from the induction motor 22 is transmitted to the power system 1 side. When power is received from the power system 1 side and supplied to the induction motor 22, the first frequency converter 24 converts the frequency of the power system 1 into the frequency of the induction motor 22.

When DC power from the secondary battery 23 is discharged to the power system 1 side, the second frequency converter 25 converts the DC power from the secondary battery 23 into AC power suitable for the frequency of the power system 1. Also, when the secondary battery 23 is charged with AC power from the power system 1 side, the second frequency converter 25 converts the AC power of the power system 1 into DC power.

The two-shaft gas turbine power generating facility of the present embodiment further includes a rotational speed meter 41 configured to detect a rotational speed of the induction motor 22, a thermometer 42 configured to detect a temperature T of the air A suctioned by the compressor 11, and an ammeter 43 configured to detect a current I flowing between the secondary battery 23 and the second frequency converter 25. The motor rotor 22r of the induction motor 22 and the compressor rotor 11r are mechanically connected as described above. Thus, the rotational speed meter 41 detects rotational speeds of the induction motor 22 and the compressor 11.

Figure 2:
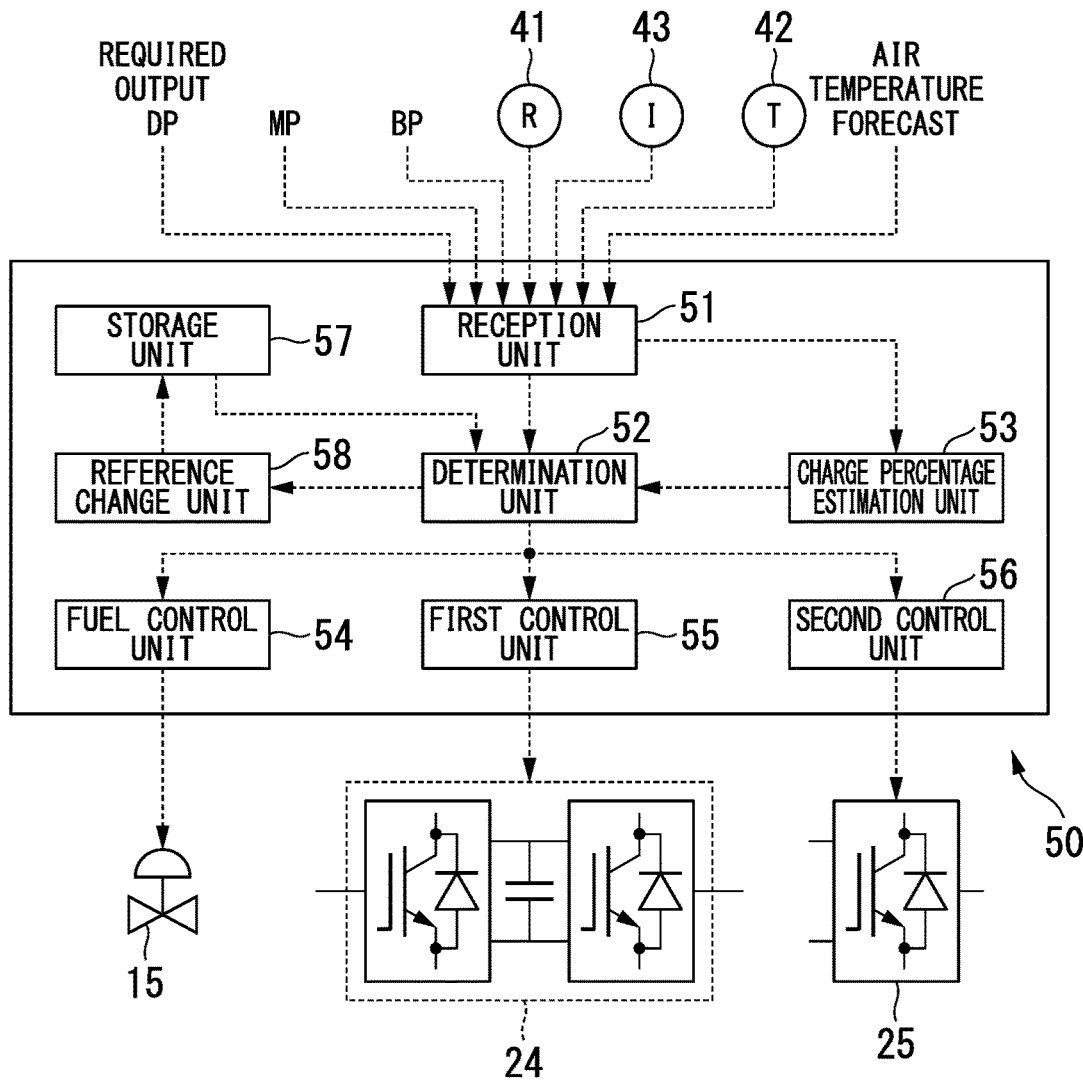
FIG. 2 is a functional block diagram of a control device according to an embodiment of the present invention.

As shown in FIG. 2, the control device 50 includes a reception unit 51 configured to receive outputs from various types of instruments, various types of external information, and the like, a determination unit 52 configured to make various types of determinations, a charge percentage estimation unit 53 configured to estimate a charge percentage SOC (state of charge) of the secondary battery 23, a fuel control unit 54 configured to control a degree of opening of the fuel adjustment valve 15, a first control unit 55 configured to control the first frequency converter 24, a second control unit 56 configured to control the second frequency converter 25, a storage unit 57 storing a reference charge percentage SOCb of the secondary battery 23 and the like, and a reference change unit 58 configured to change the reference charge percentage SOCb of the secondary battery 23.

The reception unit 51 receives a required output DP for the two-shaft gas turbine power generating facility and a forecast of the temperature of the air A suctioned by the compressor 11, i.e., an air temperature forecast. The reception unit 51 receives the rotational speed R detected by the rotational speed meter 41, the current value I detected by the ammeter 43, and the temperature T detected by the thermometer 42. The reception unit 51 further receives an amount of power MP transmitted and received by the induction motor 22 with respect to the power system 1 from the first frequency converter 24 and receives an amount of power BP with which the secondary battery 23 is charged and discharged with respect to the power system 1 from the second frequency converter 25.

The charge percentage estimation unit 53 estimates the charge percentage SOC of the secondary battery 23 on the basis of the current value I detected by the ammeter 43. Specifically, the charge percentage estimation unit 53 sequentially sums amounts of current with which the secondary battery 23 is charged and discharged. Then, this sum amount is subtracted from an amount of full charge of the secondary battery 23 and a value after the subtraction is divided by the amount of full charge to obtain the charge percentage SOC. Although there are various types of methods of estimating the charge percentage SOC of the secondary battery 23, any of these methods may be used. For example, an inter-terminal voltage of the secondary battery 23 may be measured when the secondary battery 23 is not being charged or discharged and the charge percentage SOC may be estimated on the basis of the inter-terminal voltage.

As described above, the reference charge percentage SOCb of the secondary battery 23 and the like are stored in the storage unit 57. The reference charge percentage SOCb is a charge percentage SOC, for example, when the secondary battery 23 is charged with an amount of power that is 0.6 times the amount of full charge related to the secondary battery 23. The reference change unit 58 changes the reference charge percentage SOCb stored in the storage unit 57.

The control device 50 includes a computer. The reception unit 51 and each of the control units 54, 55, and 56 include an input/output interface of the computer, a CPU configured to perform various types of arithmetic operations, a memory storing a program to be executed by the CPU, and the like. The determination unit 52, the charge percentage estimation unit 53, and the reference change unit 58 include the CPU, the memory, and the like of the computer. Also, the storage unit 57 includes the memory of the computer or the like.

Next, a basic operation of the two-shaft gas turbine power generating facility described above will be described with reference to FIG. 1 and FIG. 2.

As shown in FIG. 1, the compressor 11 of the two-shaft gas turbine 10 compresses the air A and supplies the compressed air A to the combustor 12. In addition to the compressed air A, the fuel F is also supplied to the combustor 12. In the combustor 12, the fuel F is combusted in the compressed air A and high-temperature and high-pressure combustion gas is generated. This combustion gas is transmitted from the combustor 12 into the high-pressure turbine casing 13c to rotate the high-pressure turbine rotor 13r. A rotational driving force generated in the high-pressure turbine 13 is used for the rotation of the compressor rotor 11r. The combustion gas rotating the high-pressure turbine rotor 13r is discharged from the high-pressure turbine casing 13c and flows into the low-pressure turbine casing 14c. This combustion gas rotates the low-pressure turbine rotor 14r. In the rotation of the low-pressure turbine rotor 14r, the power generator rotor 21r connected to the low-pressure turbine rotor 14r also rotates. As a result, the power generator 21 generates power. The power from the power generator 21 is transmitted to the power system 1 via the main power path 31.

When the two-shaft gas turbine 10 is activated, the induction motor 22 is driven to rotate the first rotor 17 of the two-shaft gas turbine 10. At this time, the first frequency converter 24 receives power from the power system 1 and transmits the power to the induction motor 22. The first frequency converter 24 gradually increases the frequency of the power transmitted to the induction motor 22. As a result, the rotational speed of the first rotor 17 is gradually increased. When the rotational speed of the first rotor 17 becomes higher than or equal to a predetermined rotational speed, fuel supply to the combustor 12 is started. The amount of fuel supplied to the combustor 12 is gradually increased. As the fuel supply amount increases, the rotational speed of the high-pressure turbine rotor 13r increases and the first rotor 17 including the high-pressure turbine rotor 13r can rotate independently. When this state is reached, power supply from the power system 1 to the induction motor 22 is terminated.

Next, an operation of the control device 50 will be described in accordance with a functional block diagram shown in FIG. 2 and flowcharts shown in FIGS. 3 to 9.

Figure 3:
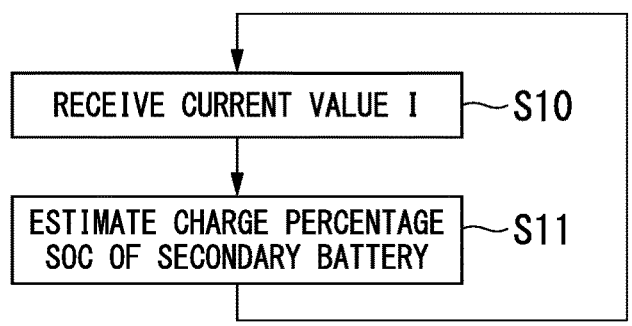
FIG. 3 is a flowchart (part 1) showing an operation of the control device according to an embodiment of the present invention.

As shown in FIGS. 2 and 3, the reception unit 51 of the control device 50 always receives a current value I detected by the ammeter 43 (S10: current value reception process).

The charge percentage estimation unit 53 of the control device 50 sums current values I of currents with which the secondary battery 23 is charged and discharged. The charge percentage estimation unit 53 subtracts the sum of the current values from an amount of full charge of the secondary battery 23, divides a value after the subtraction by an amount of full charge, and obtains a charge percentage SOC (S11: charge percentage estimation process).

Figure 4:
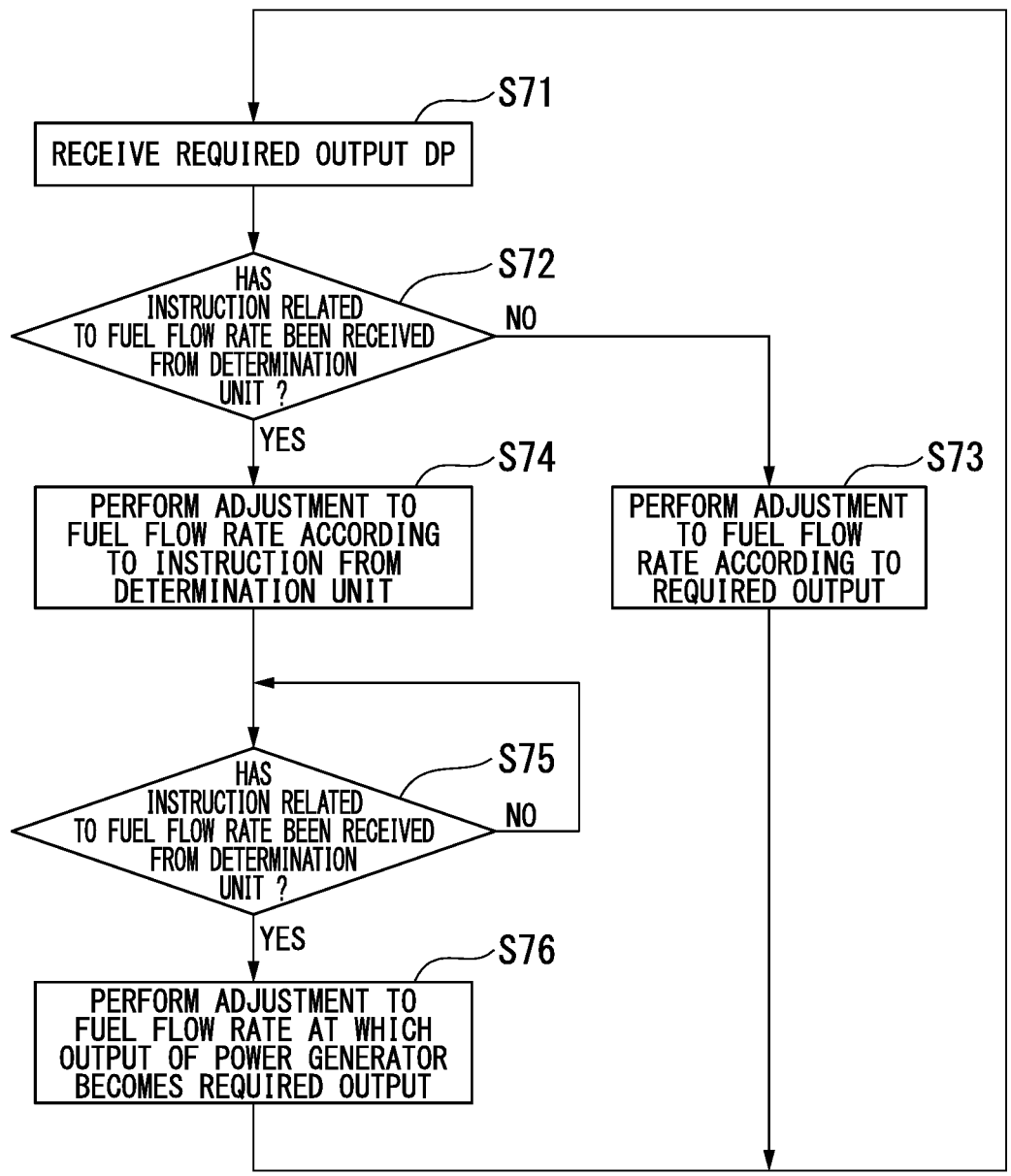
FIG. 4 is a flowchart (part 2) showing an operation of the control device according to an embodiment of the present invention.

As shown in FIGS. 2 and 4, the fuel control unit 54 of the control device 50 receives a required output DP for the two-shaft gas turbine power generating facility from the reception unit 51 of the control device 50 via the determination unit 52 (S71: required output reception process). After the required output DP is received, the fuel control unit 54 determines whether or not an instruction related to a fuel flow rate has been received from the determination unit 52 (S72). If the fuel control unit 54 has not received the instruction related to the fuel flow rate after the required output DP is received, the fuel control unit 54 determines the fuel flow rate according to the required output DP and indicates a degree of opening corresponding to the fuel flow rate to the fuel adjustment valve 15 (S73: fuel control process).

A maximum output change rate dGPmax is determined from the viewpoints of protection of the high-pressure turbine 13 and the low-pressure turbine 14 with respect to the output change rate of the two-shaft gas turbine 10, i.e., the output change rate of the power generator 21. Also, the output change rate here is an amount of change per unit time of an output. The maximum power change rate dGPmax includes a positive maximum power change rate dGPmax when the output increases and a negative maximum power change rate dGPmax when the output decreases. Also, the required output change rate dDP includes a positive required output change rate dDP when the required output DP increases and a negative required output change rate dDP when the required output DP decreases.

If the required output change rate dDP is 0, i.e., if the required output DP is not changing, the fuel control unit 54 determines a fuel flow rate so that the power generator's output GP becomes an output suitable for the required output DP, and sets the fuel flow rate and indicates a degree of opening according to the fuel flow rate to the fuel adjustment valve 15. When the absolute value of the required output change rate dDP is less than or equal to an absolute value of the maximum output change rate dGPmax of the power generator 21, the fuel control unit 54 determines a fuel flow rate so that a change rate of the power generator's output GP becomes the required output change rate dDP and indicates a degree of opening according to the fuel flow rate to the fuel adjustment valve 15. When the absolute value of the required output change rate dDP is greater than the absolute value of the maximum power change rate dGPmax of the power generator 21, the fuel control unit 54 determines a fuel flow rate so that a change rate of a power generator's output GP becomes the maximum output change rate dGPmax of the power generator's output GP and indicates a degree of opening according to the fuel flow rate to the fuel adjustment valve 15. However, the fuel control unit 54 first determines the fuel flow rate so that the power generator's output GP becomes an output for the required output DP without using the comparison of the magnitude relationship between the absolute value of the required output change rate dDP and the absolute value of the maximum output change rate dGPmax of the power generator 21. Thereafter, the fuel control unit 54 limits a change rate of the fuel flow rate and indicates a degree of opening according to the limited fuel flow rate to the fuel adjustment valve 15.

When it is determined that the instruction related to the fuel flow rate has been received from the determination unit 52 after the required output DP is received in the processing of S72, the fuel control unit 54 determines the fuel flow rate in accordance with the instruction from the determination unit 52 and indicates a degree of opening to the fuel adjustment valve 15 in accordance with the fuel flow rate (S74: fuel control process). Thereafter, the fuel control unit 54 determines whether or not a new instruction related to the fuel flow rate has been received (S75). When it is determined that a new instruction related to the fuel flow rate has been received from the determination unit 52, the fuel control unit 54 determines the fuel flow rate at which the output of the power generator becomes the required output DP in accordance with this new instruction and indicates a degree of opening degree according to this fuel flow rate to the fuel adjustment valve 15 (S76: fuel control process). Also, details of the instruction received from the determination unit 52 by the fuel control unit 54 will be described below.

Figure 5:
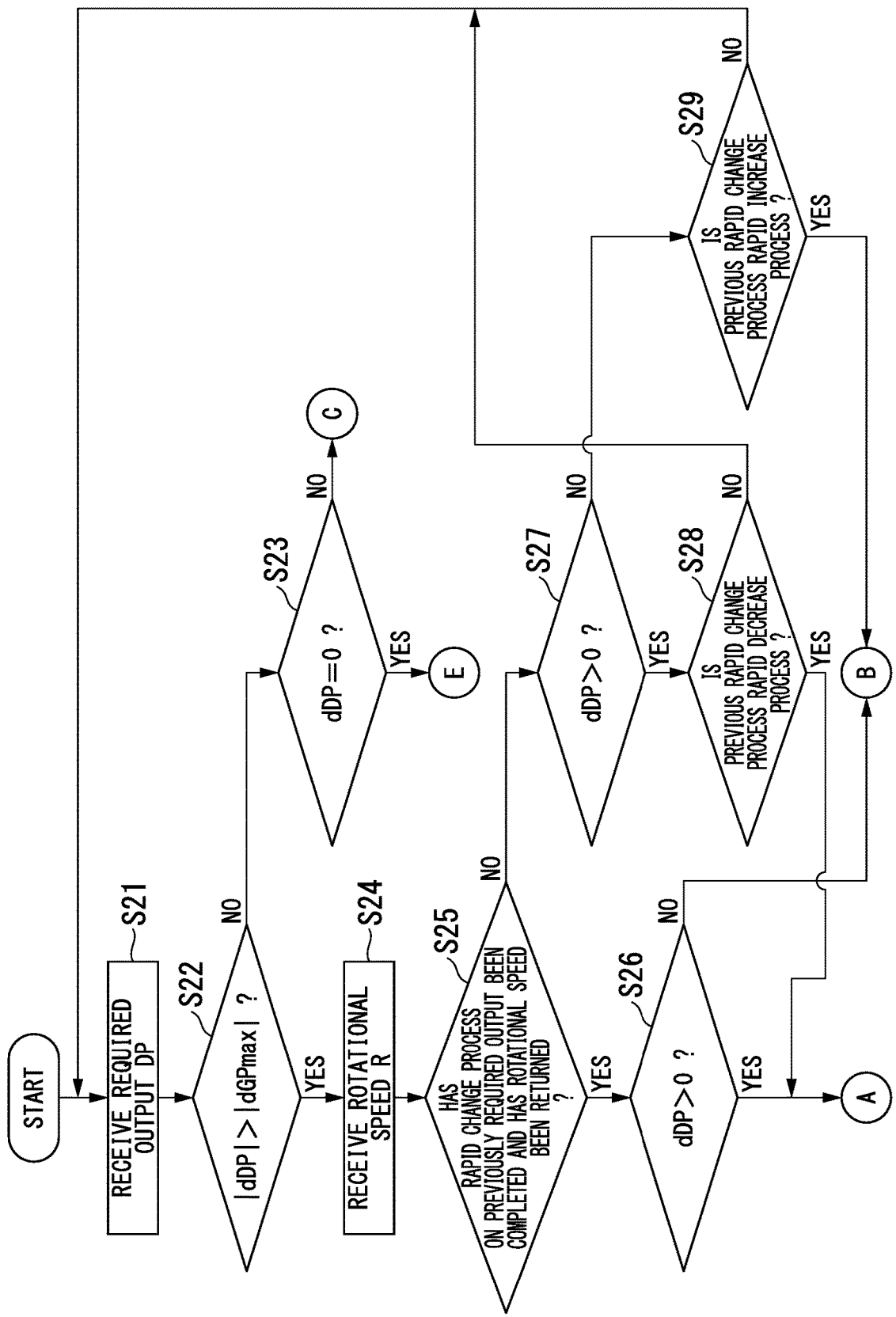
FIG. 5 is a flowchart (part 3) showing an operation of the control device according to an embodiment of the present invention.

As shown in FIG. 5, the reception unit 51 of the control device 50 receives the required output DP for the two-shaft gas turbine power generating facility (S21: required output reception process). As described above, this required output DP is transmitted from the reception unit 51 to the fuel control unit 54 via the determination unit 52.

Figure 7:
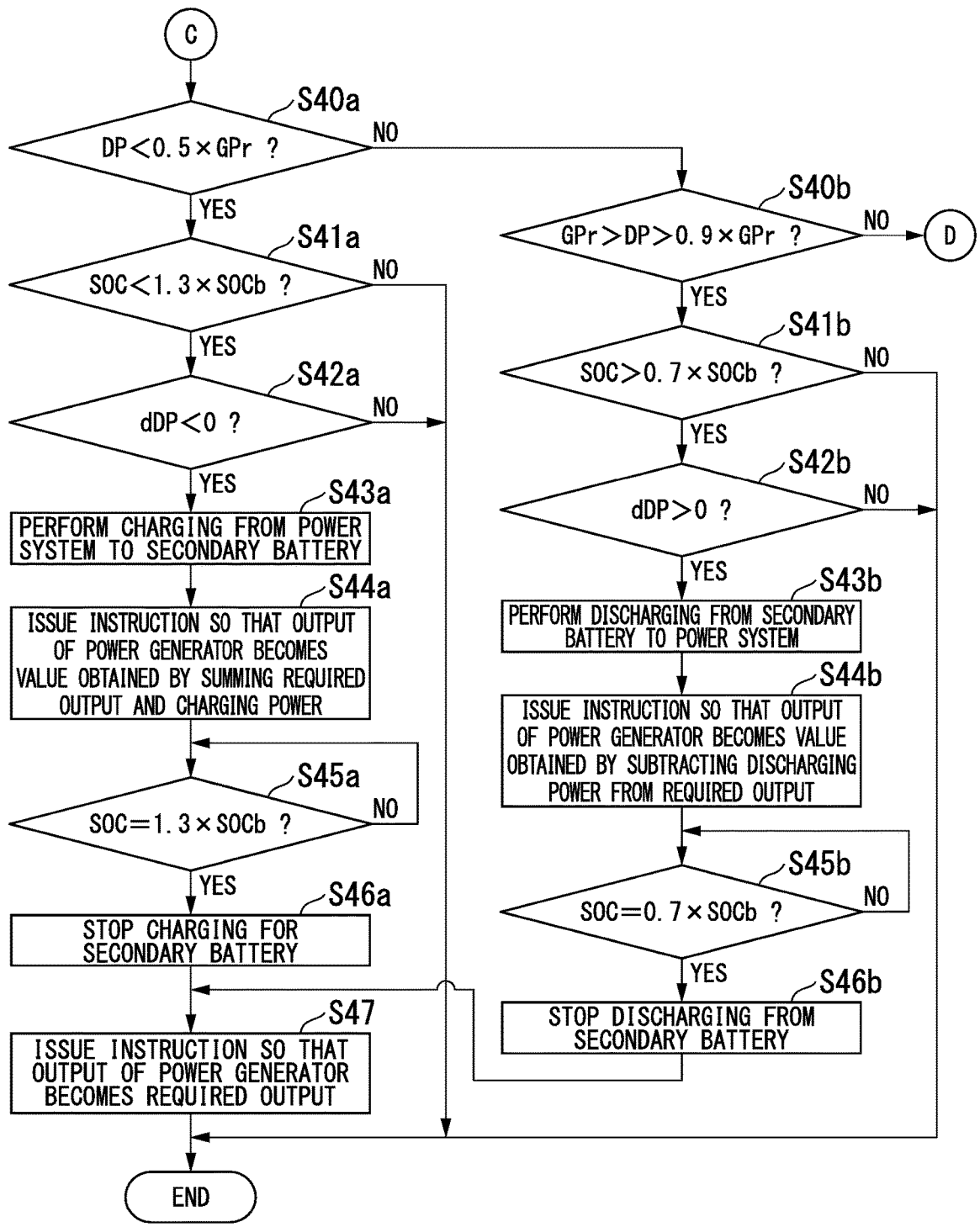
FIG. 7 is a flowchart (part 5) showing an operation of the control device according to an embodiment of the present invention.
Figure 8:
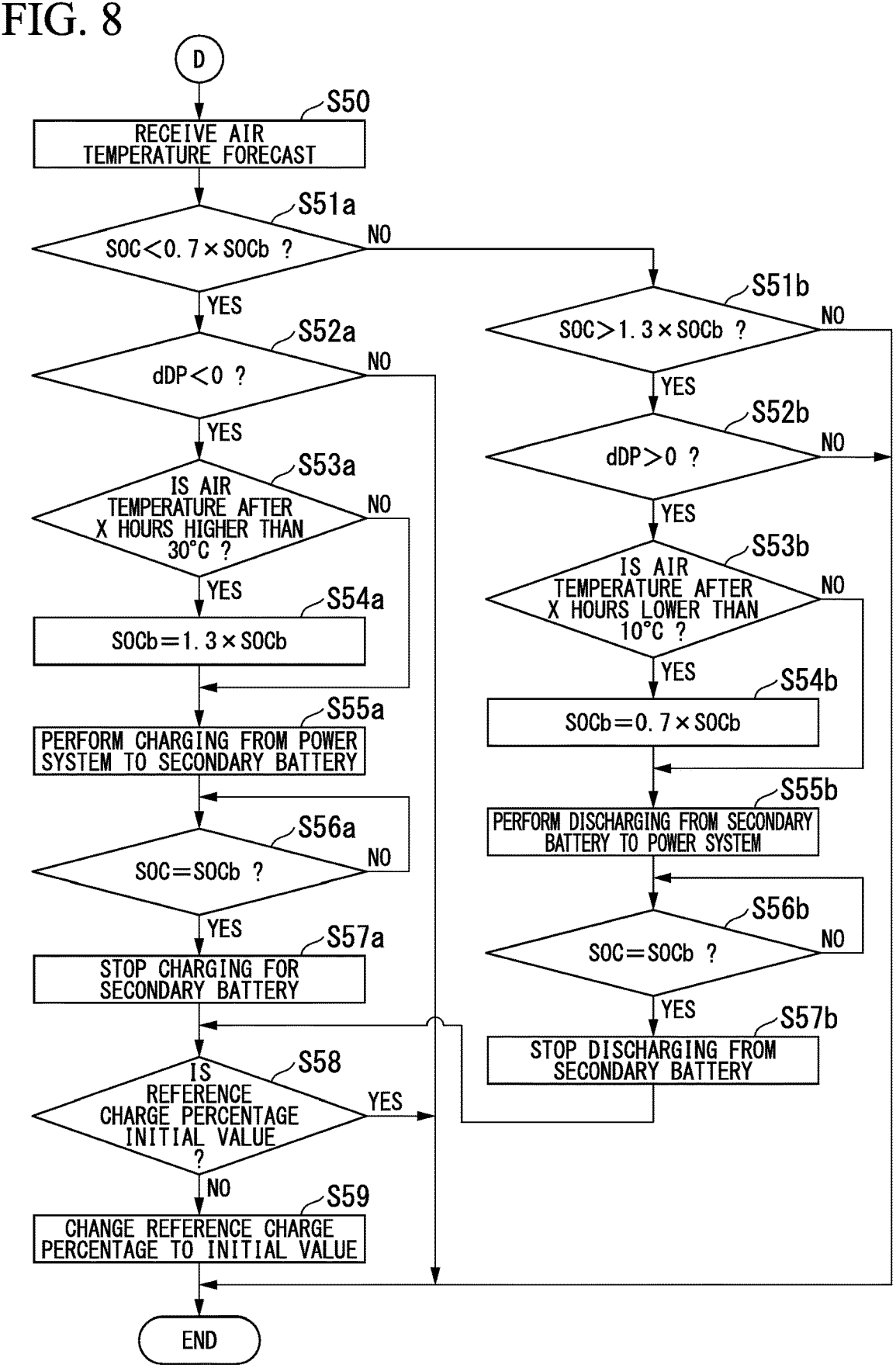
FIG. 8 is a flowchart (part 6) showing an operation of the control device according to an embodiment of the present invention.

The determination unit 52 of the control device 50 determines whether or not the absolute value of the required output change rate dDP is greater than the absolute value of the maximum power change rate dGPmax of the power generator 21 (S22: first determination process). When the determination unit 52 determines that the absolute value of the required output change rate dDP is not greater than the absolute value of the maximum output change rate dGPmax of the power generator 21, i.e., that the change in the required output DP is not rapid, the determination unit 52 determines whether or not the required output change rate dDP is 0 (S23). When the determination unit 52 determines that the required output change rate dDP is 0, a constant output process (S60, S61a to S68a, and S61b to S68b) described below is executed with reference to FIG. 9. Also, when the determination unit 52 determines that the required output change rate dDP is not 0, i.e., the change in the required output DP is slow, a slow change process (S40a to S46a, S40b to S46b, S47, S50, S51a to S57a, S51b to S57b, S58, and S59) to be described below with reference to FIGS. 7 and 8 is executed.

When the determination unit 52 determines that the absolute value of the required output change rate dDP is greater than the absolute value of the maximum output change rate dGPmax of the power generator 21, i.e., the change in the required output DP is rapid, in S22, the reception unit 51 receives a rotational speed from the rotational speed meter 41 (S24: rotational speed reception process).

The determination unit 52 determines whether or not the rapid change process on the required output DP has been completed and the rotational speed R received by the reception unit 51 has returned to an original rotation speed (S25: fourth determination process). The rapid change process on the required output DP includes processes of a rapid increase process (S30a to S38a) and a rapid decrease process (S30b to S38b) to be described below with reference to FIG. 6. Also, the original rotational speed is a rotational speed of each of the compressor 11 and the induction motor 22 at a point in time at which the required output DP with a rapid change has been received. Also, whether or not the rotational speed R received by the reception unit 51 has returned to the original rotational speed can be determined by whether or not the rotational speed R received by the reception unit 51 is within, for example, ±1%, of a rated rotational speed of the compressor 11 on the basis of the original rotational speed.

Figure 6:
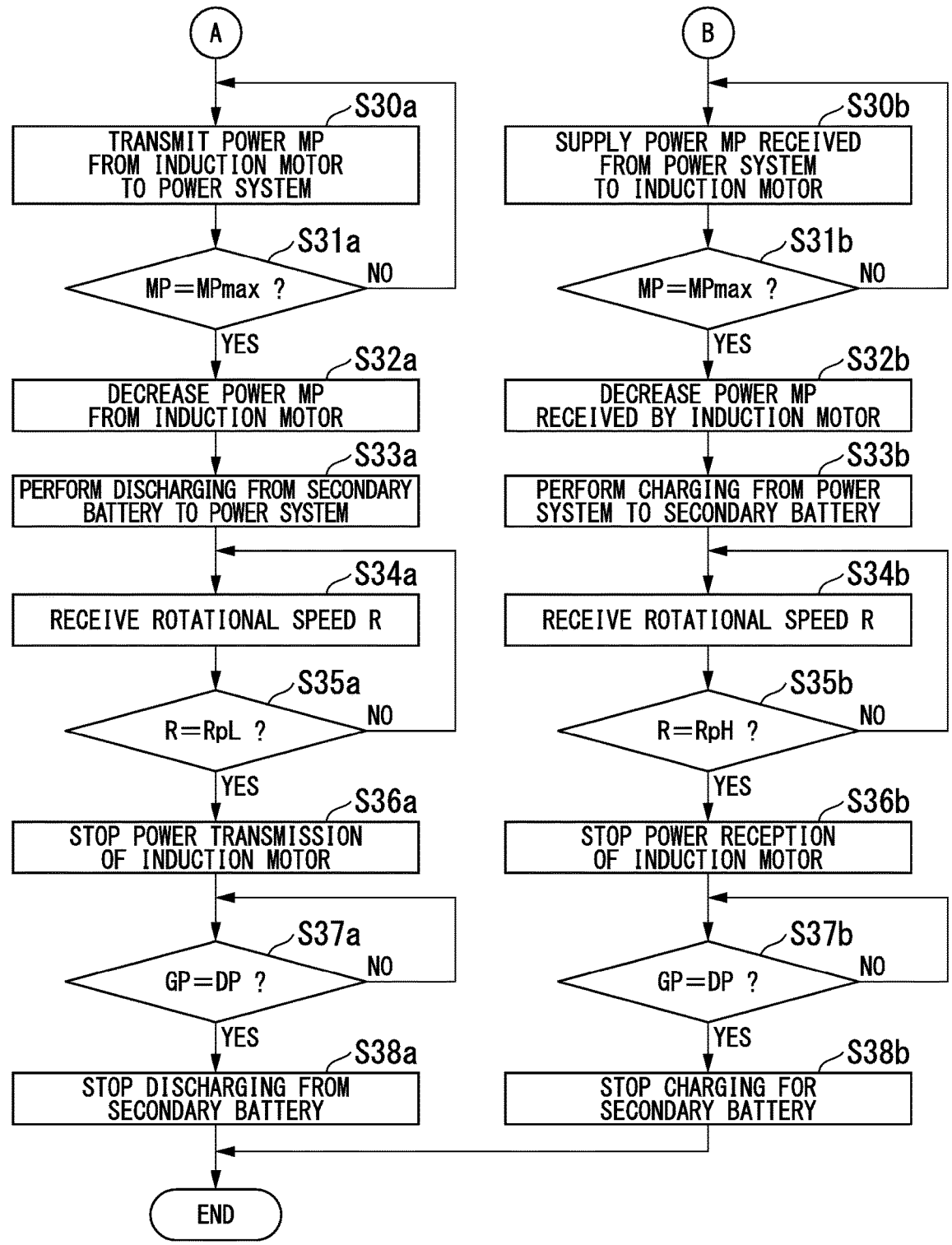
FIG. 6 is a flowchart (part 4) showing an operation of the control device according to an embodiment of the present invention.

When it is determined that the rotational speed R received by the reception unit 51 has returned to the original rotational speed, the determination unit 52 determines whether or not the change rate dDP of the required output DP newly received by the reception unit 51 is positive, i.e., whether or not the newly required output DP is rapidly increasing (S26). When the determination unit 52 determines that the newly required output DP has rapidly increased, the rapid increase process (S30a to S38a) shown in FIG. 6 is executed. When the determination unit 52 determines that the change rate dDP of the newly required output DP is not positive, i.e., that the newly required output DP has rapidly decreased, the rapid decrease process (S30b to S38b) shown in FIG. 6 is executed.

When it is determined that the rotational speed R received by the reception unit 51 has not returned to the original rotational speed in S25, the determination unit 52 determines whether or not the change rate dDP of the newly required output DP is positive, i.e., whether or not the newly required output DP has rapidly increased (S27). When it is determined that the newly required output DP has rapidly increased, the determination unit 52 determines whether or not a previous rapid change process has been the rapid decrease process (S28: fifth determination process). That is, the determination unit 52 determines whether or not the positive or negative sign of the required output change rate dDP of the previously required output DP is opposite to the positive or negative sign of the required output change rate dDP of the newly required output DP. When the determination unit 52 determines that the previous rapid change process is the rapid decrease process, the rapid increase process (S30a to S38a) based on the newly required output DP is executed. Also, when the determination unit 52 determines that the previous rapid change process is not the rapid decrease process, the process returns to the processing of S21.

If it is determined that the change rate of the newly required output DP is not positive, i.e., that the newly required output DP has rapidly decreased in S27, the determination unit 52 determines whether or not the previous rapid change process has been the rapid increase process (S29: fifth determination process). That is, also here, the determination unit 52 determines whether or not the positive or negative sign of the required output change rate dDP of the previously required output DP is opposite to the positive or negative sign of the required output change rate dDP of the newly required output DP. When the determination unit 52 determines that the previous rapid change process is the rapid increase process, the rapid decrease process (S30b to S38b) based on the newly required output DP is executed.

When the determination unit 52 determines that the previous rapid change process is not the rapid increase process, the process returns to the processing of S21.

Next, in accordance with the flowchart shown in FIG. 6, the rapid change process will be described in detail. As described above, this rapid change process includes the rapid increase process (S30a to S38a) and the rapid decrease process (S30b to S38b).

The rapid increase process (S30a to S38a) is executed when the newly required output DP rapidly increases as described above. However, even when the newly required output DP rapidly increases, the rapid increase process (S30a to S38a) is not executed if the rotational speed does not return to the original rotational speed after the rotational speed R of each of the compressor 11 and the induction motor 22 changes due to the rapid change process on the previously required output DP and the previous rapid change process is the rapid increase process.

Figure 10:
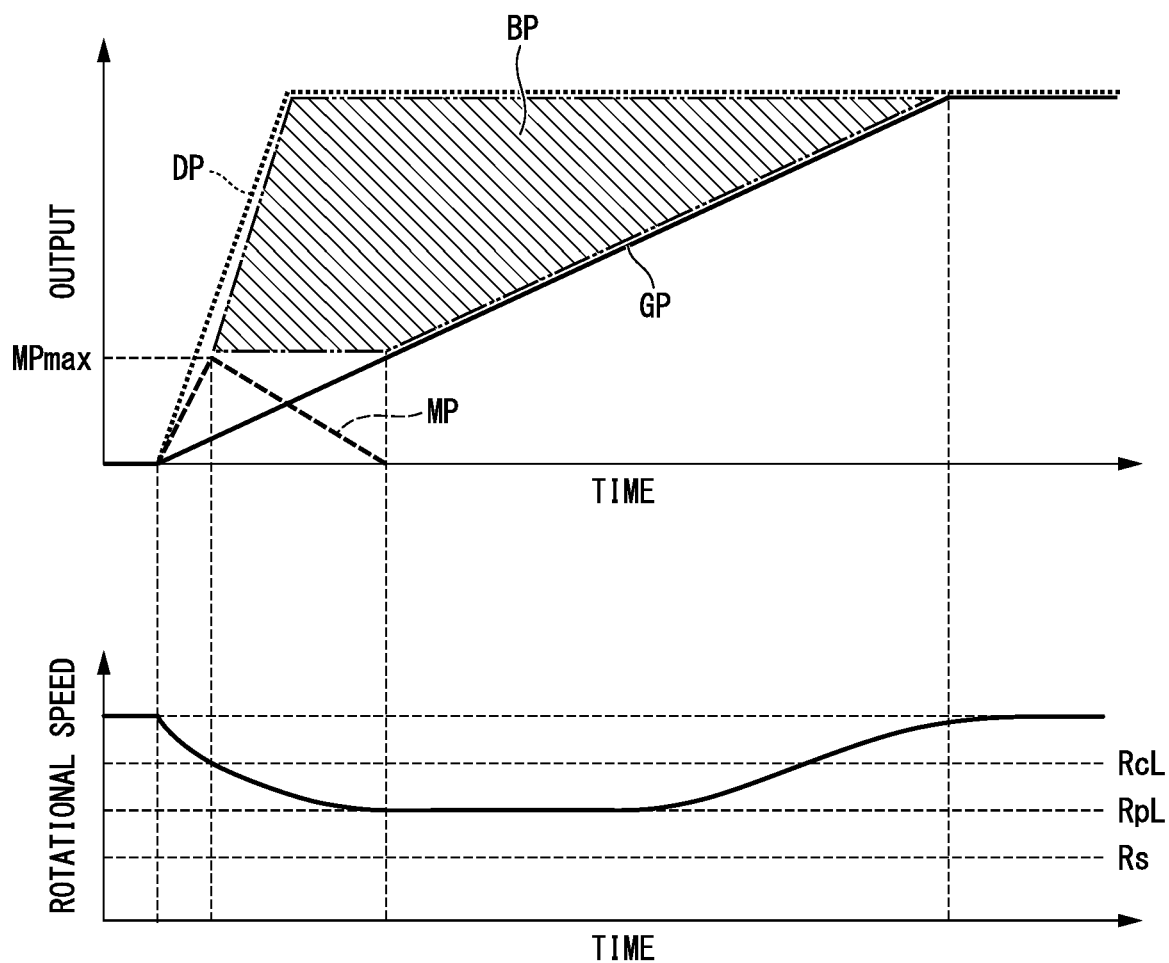
FIG. 10 is an explanatory diagram showing a change in an output when a required output that rapidly increases is received and a change in a rotational speed of a compressor according to an embodiment of the present invention.

In the rapid increase process (S30a to S38a), i.e., when the newly required output DP rapidly increases, the first control unit 55 causes power MP to be transmitted from the induction motor 22 to the power system 1 by the first frequency converter 24 (S30a: first control process). At this time, as shown in FIG. 10, the first control unit 55 controls the power MP to be transmitted from the induction motor 22 to the power system 1 by the first frequency converter 24 so that a value (=GP+MP) obtained by summing the power generator's output GP at each time after reception of the newly required output DP and the power MP to be transmitted from the induction motor 22 to the power system 1 at the same time becomes the required output DP at the same time. Thus, when the required output DP rapidly increases, the power MP to be transmitted from the induction motor 22 to the power system 1 increases initially with the elapse of time.

In the induction motor 22, the maximum allowable value related to the power MP to be transmitted and received by the induction motor 22 is determined. That is, the maximum allowable power MPmax is determined in the induction motor 22. After power transmission by the induction motor 22 is started, the determination unit 52 determines whether or not the power MP from the induction motor 22 has reached the maximum allowable power MPmax (S31a: second determination process). Also, a value of the power MP from the induction motor 22 is transmitted from the first frequency converter 24 to the control device 50. When the determination unit 52 determines that the power MP from the induction motor 22 has not reached the maximum allowable power MPmax, the process returns to S30a.

Also, when the determination unit 52 determines that the power MP from the induction motor 22 has reached the maximum allowable power MPmax, the first control unit 55 causes the power MP to be transmitted from the induction motor 22 to the power system 1 to be gradually decreased with the elapse of time by the first frequency converter 24 as shown in FIG. 10 (S32a). Further, when the determination unit 52 determines that the power MP from the induction motor 22 has reached the maximum allowable power MPmax, the second control unit 56 causes discharging from the secondary battery 23 to the power system 1 to be started by the second frequency converter 25 (S33a: second control process). At this time, as shown in FIG. 10, the second control unit 56 controls the power BP to be discharged from the secondary battery 23 to the power system 1 by the second frequency converter 25 so that a value (=GP+MP+ BP) obtained by summing the power generator's output GP at each time after power from the induction motor 22 reaches the maximum allowable power MPmax, the power MP to be transmitted from the induction motor 22 to the power system 1 at the same time, and the power BP to be discharged from the secondary battery 23 to the power system 1 becomes the required output DP at the same time.

Figure 11:
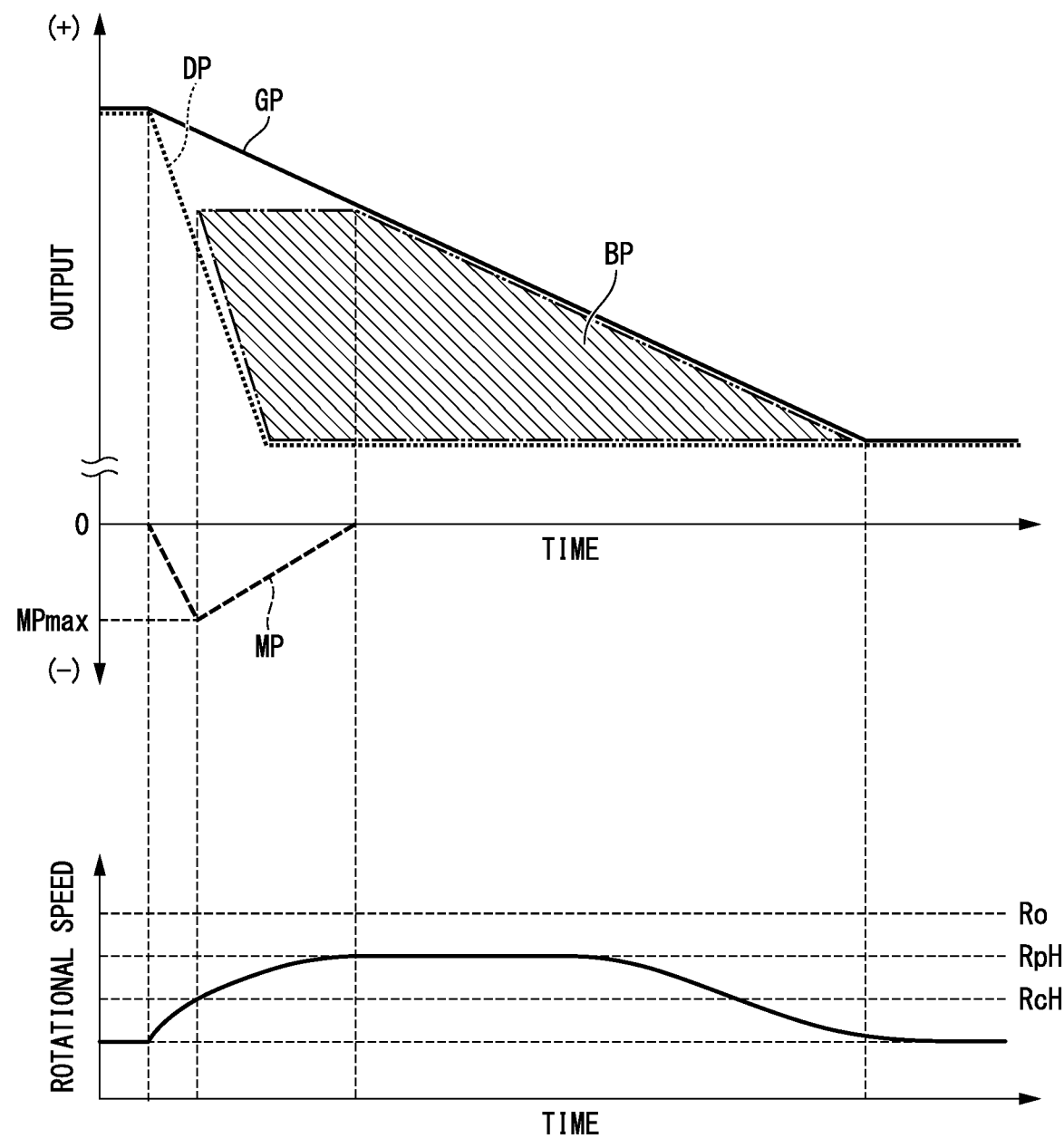
FIG. 11 is an explanatory diagram showing a change in an output when a required output that rapidly decreases is received and a change in a rotational speed of the compressor according to an embodiment of the present invention.

An energy source of the power MP to be transmitted and received by the induction motor 22 is rotational inertial energy of the first rotor 17. Thus, when power is transmitted from the induction motor 22 to the power system 1, the rotational speed of the first rotor 17 (=rotational speeds of the induction motor 22 and the compressor 11) decreases as shown in FIG. 10. On the other hand, when the first frequency converter 24 receives the power of the power system 1 and supplies the received power to the induction motor 22, the rotational speed of the first rotor 17 increases as shown in FIG. 11. When this power transmission/reception is stopped after the power transmission/reception of the induction motor 22, the rotational speed R of the first rotor 17 returns to a rotational speed immediately before the start of power transmission/reception.

An allowable rotational speed range is determined in the compressor 11 from the viewpoint of protecting the compressor 11. This allowable rotational speed range is determined by an allowable upper limit rotational speed RpH and an allowable lower limit rotational speed RpL. The allowable upper limit rotational speed is a rotational speed determined to prevent damage of the compressor rotor 11r, bearings thereof, and the like when the rotational speed of the compressor 11 becomes an excessive rotational speed Ro (see FIG. 11). Also, the allowable lower limit rotational speed is higher than a surge rotational speed Rs (see FIG. 10) at which surging occurs in the compressor 11 and is a rotational speed for preventing occurrence of surging.

When power to be transmitted from the induction motor 22 to the power system 1 starts to decrease, the reception unit 51 detects the rotational speed R of the first rotor 17 (=rotational speeds of the induction motor 22 and the compressor 11) detected by the rotational speed meter 41 (S34a). The determination unit 52 determines whether this rotational speed R has reached a limit in the allowable rotational speed range or whether or not the rotational speed R has reached the allowable lower limit rotational speed RpL in this case (S35a: third determination process). If the rotational speed R of the first rotor 17 has not reached the allowable lower limit rotational speed RpL, the processing of S34a and S35a is iterated. If the rotational speed R of the first rotor 17 has reached the allowable lower limit rotational speed RpL, the first control unit 55 causes the power transmission of the induction motor 22 by the first frequency converter 24 to be stopped (S36a). As a result, as shown in FIG. 10, the decrease in the rotational speed of the first rotor 17 is stopped. Thereafter, the rotational speed of the first rotor 17 gradually returns to the original rotational speed, i.e., the rotational speed immediately before the power transmission of the induction motor 22 is started (=a rotational speed at a point in time at which a rapidly changed required output DP has been received).

After the power transmission of the induction motor 22 is stopped, the determination unit 52 determines whether or not the power generator's output GP has reached the changed required output DP (S37a). The determination unit 52 iterates this determination until the power generator's output GP reaches the changed required output DP. When the determination unit 52 determines that the power generator's output GP has reached the changed required output DP, the second control unit 56 causes discharging of the secondary battery 23 by the second frequency converter 25 to be stopped (S38a).

Accordingly, the rapid increase process is completed. Also, when the rapid increase process is executed, i.e., when it is determined that the required output DP rapidly increases (S22 and S26), the fuel control unit 54 determines a fuel flow rate according to the required output DP and indicates a degree of opening according to the fuel flow rate to the fuel adjustment valve 15 as described with reference to FIG. 4 (S73: fuel control process). In this case, the fuel control unit 54 determines the fuel flow rate so that a change rate of the power generator's output GP matches the maximum power change rate dGPmax (a positive value) of the power generator's output GP, and indicates a degree of opening according to this fuel flow rate to the fuel adjustment valve 15.

The rapid decrease process (S30b to S38b) is executed when the newly required output DP is rapidly decreased as described above. However, even when the newly required output DP rapidly decreases, the rapid decrease process (S30b to S38b) is not executed if the rotational speed has not returned to the original rotational speed after the rotational speed R of each of the compressor 11 and the induction motor 22 is changed due to the rapid change process on the previously required output DP and the previous rapid change process is a rapid decrease process.

In the rapid decrease process (S30b to S38b), i.e., when the newly required output DP is rapidly decreased, the first control unit 55 supplies the power MP received from the power system 1 to the induction motor 22 by the first frequency converter 24 (S30b: first control process). At this time, as shown in FIG. 11, the first control unit 55 causes the power MP to be supplied to the induction motor 22 to be controlled by the first frequency converter 24 so that a value (=GP+MP (<0)) obtained by summing the power generator's output GP at each time after reception of the newly required output DP and the power MP received from the power system 1 at the same time and supplied to the induction motor 22 (a power value is a negative value in this case) reaches the required output DP at the same time. Thus, when the required output DP decreases rapidly, the power received from the power system 1 and supplied to the induction motor 22 initially increases with the elapse of time.

After the power reception for the induction motor 22 starts, the determination unit 52 determines whether or not the power MP for the induction motor 22, i.e., the power MP received by the induction motor 22, has reached the maximum allowable power MPmax (S31b). When the determination unit 52 determines that the power MP received by the induction motor 22 has not reached the maximum allowable power MPmax, the process returns to S30b.

Also, when the determination unit 52 determines that the power MP received by the induction motor 22 has reached the maximum allowable power MPmax, the first control unit 55 causes the power MP received by the induction motor 22 to be gradually decreased with the elapse of time by the first frequency converter 24 as shown in FIG. 11 (S32b). Furthermore, when the determination unit 52 determines that the value of the power MP received by the induction motor 22 has reached the maximum allowable power MPmax, the second control unit 56 causes charging for the secondary battery 23 to be started by the second frequency converter 25 (S33b: second control process). At this time, as shown in FIG. 11, the second control unit 56 causes the charging power BP of the secondary battery 23 to be controlled by the second frequency converter 25 so that a value obtained by subtracting the power MP received by the induction motor 22 at the same time and the charging power BP of the secondary battery 23 at the same time from the power generator's output GP at each time after the power MP received by the induction motor 22 reaches the maximum allowable power MPmax reaches the required output DP at the same time. If the power MP received by the induction motor 22 is treated as a negative value and the charging power BP of the secondary battery 23 is treated as a negative value, the charging power BP of the secondary battery 23 is controlled by the second frequency converter 25 so that a value obtained by summing the power generator's output GP at each time after the power MP received by the induction motor 22 reaches the maximum allowable power MPmax, the power MP received by the induction motor 22 at the same time, and the charging power BP of the secondary battery 23 at the same time reaches the required output DP at the same time.

When the power MP received by the induction motor 22 from the power system 1 starts to decrease, the reception unit 51 receives a rotational speed R of the first rotor 17 detected by the rotational speed meter 41 (=rotational speeds of the induction motor 22 and the compressor 11) (S34b). The determination unit 52 determines whether the rotational speed R has reached a limit in the allowable rotational speed range or whether or not the rotational speed R has reached the allowable upper limit rotational speed RpH in this case (S35b: third determination process). If the rotational speed R of the first rotor 17 has not reached the allowable upper limit rotational speed RpH, the processing of S34b and S35b is iterated. If the rotational speed R of the first rotor 17 has reached the allowable upper limit rotational speed RpH, the first control unit 55 causes power reception of the induction motor 22 by the first frequency converter 24 to be stopped (S36b). As a result, as shown in FIG. 11, an increase in the rotational speed of the first rotor 17 is stopped. Thereafter, the rotational speed R of the first rotor 17 gradually returns to an original rotational speed, i.e., a rotational speed immediately before the power reception by the induction motor 22 is started (=a rotational speed at a point in time at which the required output DP with a rapid change has been received).

After the power reception by the induction motor 22 is stopped, the determination unit 52 determines whether or not the power generator's output GP has reached the changed required output DP (S37b). The determination unit 52 iterates this determination until the power generator's output GP reaches the changed required output DP. When the determination unit 52 determines that the power generator's output GP has reached the changed required output DP, the second control unit 56 causes charging of the secondary battery 23 by the second frequency converter 25 to be stopped (S38b).

Accordingly, the rapid decrease process is completed. Also, when the rapid decrease process is executed, i.e., when it is determined that the required output DP rapidly decreases (S22 and S27), the fuel control unit 54 determines a fuel flow rate according to the required output DP and indicates a degree of opening according to the fuel flow rate to the fuel adjustment valve 15 as described with reference to FIG. 4 (S73: fuel control process). In this case, the fuel control unit 54 determines the fuel flow rate so that a change rate of the power generator's output GP matches the maximum power change rate dGPmax (a negative value) of the power generator's output GP, and indicates a degree of opening according to this fuel flow rate to the fuel adjustment valve 15.

As described above, in the present embodiment, when the absolute value of the required output change rate dDP is greater than the absolute value of the maximum output change rate dGPmax, power transmission and reception are started between the induction motor 22 and the power system 1. Thus, in the present embodiment, it is possible to compensate for at least a part of the insufficiency of a change in the power generator's output GP with respect to a change in the required output DP with the power transmission/reception between the induction motor 22 and the power system 1.

Also, in the present embodiment, when the absolute value of the required output change rate dDP is greater than the absolute value of the maximum output change rate dGPmax, the secondary battery 23 is charged and discharged after the power transmitted and received by the induction motor 22 reaches the maximum allowable power MPmax. That is, in the present embodiment, even if the absolute value of the required output change rate dDP is greater than the absolute value of the maximum output change rate dGPmax, the secondary battery 23 is not charged or discharged immediately. Consequently, in the present embodiment, it is possible to reduce the number of times the secondary battery 23 is charged and discharged, and it is possible to extend the lifespan by minimizing deterioration in the performance of the secondary battery 23.

Also, in the present embodiment, if the absolute value of the required output change rate dDP is greater than the absolute value of the maximum output change rate dGPmax, the secondary battery 23 is charged and discharged when power transmitted and received by the induction motor 22 reaches the maximum allowable power MPmax while power is transmitted and received by the induction motor 22. Consequently, in the present embodiment, continuity of power transmission/reception for the power system 1 due to power transmission/reception of the induction motor 22 and charging/discharging of the secondary battery 23 is secured. Thus, in the present embodiment, even when the absolute value of the required output change rate dDP is greater than the absolute value of the maximum output change rate dGPmax, it is possible to improve the output conformability of the two-shaft gas turbine power generating facility with respect to a change in the required output DP.

Furthermore, in the present embodiment, because an amount of power transmission/reception for the induction motor 22 increases during a period in which the determination unit 52 determines that the power MP to be transmitted/received by the induction motor 22 has reached the maximum allowable power MPmax after the determination unit 52 determines that the absolute value of the required output change rate dDP is greater than the absolute value of the maximum output change rate dGPmax, it is possible to improve the output conformability of the two-shaft gas turbine power generating facility with respect to a change in the required output DP during the period.

Also, in the present embodiment, when the determination unit 52 determines that the power MP transmitted to and received from the induction motor 22 has reached the maximum allowable power MPmax, an amount of power transmission/reception for the induction motor 22 decreases. Thus, in the present embodiment, a speed at which the rotational speed R of the first rotor 17 (=rotational speeds of the induction motor 22 and the compressor 11) approaches the limit in the allowable rotational speed range can be decreased. Consequently, in the present embodiment, at a point in time at which the rotational speed R of the first rotor 17 has reached the limit in the allowable rotational speed range, it is possible to easily and accurately stop a change in a rotational speed of the first rotor 17 by stopping power transmission/reception for the induction motor 22.

Also, in the present embodiment, after the power transmission/reception for the induction motor 22 is started (S30a and S30b), the determination unit 52 determines whether or not the power MP transmitted to and received from the induction motor 22 has reached the maximum allowable power MPmax (S31a and S31b). However, after the power transmission/reception for the induction motor 22 is started (S30a and S30b), the determination unit 52 may determine whether or not the rotational speed R of the first rotor 17 (=rotational speeds of the induction motor 22 and the compressor 11) has reached a limit in a switching rotational speed range narrower than the allowable rotational speed range. This switching rotational speed range is determined by a switching upper limit rotational speed and a switching lower limit rotational speed. As shown in FIG. 10, a switching lower limit rotational speed RcL is a rotational speed higher than the allowable lower limit rotational speed RpL. Also, as shown in FIG. 11, a switching upper limit frequency RcH is a rotational speed lower than the allowable upper limit rotational speed RpH. Specifically, after the power transmission for the induction motor 22 is started (S30a), the determination unit 52 determines whether or not the rotational speed of the first rotor 17 has reached the switching lower limit rotational speed RcL. Then, when the determination unit 52 determines that the rotational speed R of the first rotor 17 is the switching lower limit rotational speed RcL, the first control unit 55 causes the power MP to be transmitted from the induction motor 22 to the power system 1 to be gradually decreased with the elapse of time by the first frequency converter 24 as shown in FIG. 10 (S32a). Also, after the power reception for the induction motor 22 is started (S30b), the determination unit 52 determines whether or not the rotational speed R of the first rotor 17 has reached the switching upper limit rotational speed RcH. Then, when the determination unit 52 determines that the rotational speed R of the first rotor 17 has reached the switching upper limit rotational speed RcH, the first control unit 55 causes the power MP received by the induction motor 22 to be gradually decreased with the elapse of time by the first frequency converter 24 as shown in FIG. 11 (S32b).

Further, after power transmission/reception for the induction motor 22 is started (S30a and S30b), the determination unit 52 may determine whether or not power transmitted to and received from the induction motor 22 has reached the maximum allowable power MPmax or whether or not the rotational speed of the first rotor 17 has reached the limit in the switching rotational speed range.

As described above, even if the newly required output DP rapidly increases, the rapid increase process (S30a to S38a) for the newly required output DP is not executed if the previous rotational speed does not return to the original rotational speed after the rotational speeds of the compressor 11 and the induction motor 22 are changed due to the rapid change process on the previously required output DP (the case of NO in S25) and the rapid change process is a rapid increase process (NO in S28). This is because discharging of the secondary battery 23 further proceeds after the rotational speeds of the compressor 11 and the induction motor 22 reach the allowable lower limit rotational speed RpL for a significantly short time when the rapid increase process is newly executed in a step in which the rotational speeds of the compressor 11 and the induction motor 22 have not returned to the original rotational speed according to a rapid increase process regardless of the fact that the previous rapid change process is the rapid increase process.

In the present embodiment, when the rapid change process on the previously required output DP is a rapid increase process and the newly required output DP is rapidly increased, the rapid increase process for a newly required process is not executed and the process returns to the processing of S21. Thus, in the present embodiment, even if the previous rapid change process is a rapid increase process and a newly required process is accepted in a step in which this rapid increase process is not completed, the previous rapid increase process is continued. However, in S74, adjustment of the fuel flow rate according to the newly required output DP is executed. Also, when the previous rapid change process is a rapid increase process and a newly required process is accepted in a step in which this rapid increase process is not completed, the previous rapid increase process may be canceled.

On the other hand, if the previous rapid change process is a rapid decrease process (the case of YES in S28) also in a step in which the rotational speeds of the compressor 11 and the induction motor 22 have not returned to the original rotational speed (the case of NO in S25), a rapid increase process (S30a to S38a) based on a newly required output DP is executed. This is because, if the previous rapid change process is a rapid decrease process, the new rapid increase process acts in a direction in which a charge percentage SOC of the secondary battery 23 returns to an original charge percentage after acting in a direction in which the rotational speeds of the compressor 11 and the induction motor 22 return to the original rotational speed.

As described above, even if the newly required output DP rapidly decreases, the rapid decrease process (S30b to S38b) for the newly required output DP is not executed if the previous rotational speed does not return to the original rotational speed after the rotational speeds of the compressor 11 and the induction motor 22 are changed due to the rapid change process on the previously required output DP (the case of NO in S25) and the rapid change process is a rapid decrease process (the case of NO in S29). This is because charging of the secondary battery 23 further proceeds after the rotational speeds of the compressor 11 and the induction motor 22 reach the allowable upper limit rotational speed RpH for a significantly short time when the rapid decrease process is newly executed in a step in which the rotational speeds of the compressor 11 and the induction motor 22 have not returned to the original rotational speed according to a rapid decrease process regardless of the fact that the previous rapid change process is the rapid decrease process.

In the present embodiment, when the rapid change process on the previously required output DP is the rapid decrease process and the newly required output DP is rapidly decreased, the rapid increase process for a newly required process is not executed and the process returns to the processing of S21. Thus, in the present embodiment, even if the previous rapid change process is a rapid decrease process and a newly required process is accepted in a step in which this rapid decrease process is not completed, the previous rapid decrease process is continued. However, in S74, adjustment of the fuel flow rate according to the newly required output DP is executed. Also, when the previous rapid change process is a rapid decrease process and a newly required process is accepted in a step in which this rapid decrease process is not completed, the previous rapid decrease process may be canceled.

On the other hand, if the previous rapid change process is a rapid increase process (the case of YES in S29) also in a step in which the rotational speeds of the compressor 11 and the induction motor 22 have not returned to the original rotational speed (the case of NO in S25), a rapid decrease process (S30b to S38b) based on a newly required output DP is executed. This is because, if the previous rapid change process is the rapid increase process, the new rapid decrease process acts in a direction in which a charge percentage SOC of the secondary battery 23 returns to an original charge percentage after acting in a direction in which the rotational speeds of the compressor 11 and the induction motor 22 return to the original rotational speed.

Next, the slow change process will be described in accordance with the flowcharts shown in FIGS. 7 and 8. As described above, this slow change process is executed when it is determined that the change in the required output DP is slow (the case of NO in S22 and NO in S23).

In this slow change process, as shown in FIG. 7, the determination unit 52 first determines whether or not the required output DP has reached a set low output lower than a rated power generator's output GPr (S40*a*: ninth determination process). The set low output is, for example, 0.5 times the output of the rated power generator's output GPr.

When it is determined that the required output DP becomes the set low output, the determination unit 52 determines whether or not the charge percentage SOC estimated by the charge percentage estimation unit is lower than the set high charge percentage higher than the reference charge percentage SOCb (S41*a*: sixth determination process). The set high charge percentage is, for example, a charge percentage SOC that is 1.3 times the reference charge percentage SOCb. When the determination unit 52 determines that the charge percentage SOC is not lower than the set high charge percentage, the slow change process is terminated. Also, when it is determined that the charge percentage SOC is lower than the set high charge percentage, the determination unit 52 determines whether or not the required output change rate dDP is negative (S42*a*: first determination process). When the determination unit 52 determines that the required output change rate dDP is not negative, the slow change process is terminated. Also, when the determination unit 52 determines that the required output change rate dDP is negative, the second control unit 56 causes the secondary battery 23 to be charged by the second frequency converter 25 (S43*a*: second control process). Then, the determination unit 52 issues an instruction to the fuel control unit 54 so that the power generator's output GP reaches a value (=DP+MP) obtained by summing the required output DP and the power MP with which the secondary battery 23 is charged (S44*a*). As described with reference to FIG. 4, after the required output is received from the determination unit 52 (S71) and the instruction from the determination unit 52 is received (S72), the fuel control unit 54 determines a fuel flow rate in accordance with the instruction from the determination unit 52 and indicates a degree of opening according to the fuel flow rate to the fuel adjustment valve 15 (S74: fuel control process). In this case, the fuel control unit 54 determines a fuel flow rate at which the power generator's output GP becomes a value (=DP+MP) obtained by summing the required output DP and the power MP with which the secondary battery 23 is charged. Consequently, the fuel control unit 54 makes a fuel flow rate higher than that of a case in which all the required output DP is secured by the power generator's output GP.

Next, the determination unit 52 determines whether or not the charge percentage SOC has reached the set high charge percentage (S45*a*). If the charge percentage SOC has not reached the set high charge percentage, the determination unit 52 waits until the charge percentage SOC reaches the set high charge percentage. When the determination unit 52 determines that the charge percentage SOC has reached the set high charge percentage, the second control unit 56 causes the charging of the secondary battery 23 to be terminated by the second frequency converter 25 (S46*a*). Then, the determination unit 52 issues an instruction to the fuel control unit 54 so that the power generator's output GP becomes the required output DP (S47). As described with reference to FIG. 4, when a new instruction is received from the determination unit (S75), the fuel control unit 54 determines a fuel flow rate in accordance with the instruction from the determination unit 52 and indicates a degree of opening according to the fuel flow rate to the fuel adjustment valve 15 (S76: fuel control process). In this case, the fuel control unit 54 determines a fuel flow rate at which the power generator's output GP becomes the required output DP.

Accordingly, the slow change process is completed. In the present embodiment, even when the required output DP is lower than the set low output, it is possible to minimize a decrease in the fuel flow rate supplied to the combustor 12 and stably operate a fuel system, a system through which combustion gas flows, and the like.

When it is determined that the required output DP has not reached the set low output lower than the rated power generator's output GPr in S40*a*, the determination unit 52 determines whether or not the required output DP has reached the set high output that is lower than the rated power generator's output GPr and higher than the set low output (S40*b*: ninth determination process). The set high output is, for example, 0.9 times the output of the rated power generator's output GPr.

When it is determined that the required output DP has reached the set high output, the determination unit 52 determines whether or not the charge percentage SOC estimated by the charge percentage estimation unit 53 is higher than the set low charge percentage lower than the reference charge percentage SOCb (S41*b*: sixth determination process). The set low charge percentage is, for example, the charge percentage SOC that is 0.7 times the reference charge percentage SOCb. When the determination unit 52 determines that the charge percentage SOC is not higher than the set low charge percentage, the slow change process is terminated. Also, when it is determined that the charge percentage SOC is higher than the set low charge percentage, the determination unit 52 determines whether or not a change rate of the required output DP is positive (S42*b*: first determination process). When the determination unit 52 determines that the change rate of the required output DP is not positive, the slow change process is terminated. When the determination unit 52 determines that the change rate of the required output DP is positive, the second control unit 56 causes the power MP to be discharged from the secondary battery 23 to the power system 1 by the second frequency converter 25 (S43*b*: second control process). Then, the determination unit 52 issues an instruction to the fuel control unit 54 so that the power generator's output GP becomes a value obtained by subtracting the power discharged from the secondary battery 23 from the required output DP (S44*b*). As described with reference to FIG. 4, after the required output is received from the determination unit 52 (S71), when the instruction from the determination unit 52 is received (S72), the fuel control unit 54 determines a fuel flow rate in accordance with the instruction from the determination unit 52 and indicates a degree of opening according to the fuel flow rate to the fuel adjustment valve 15 (S74: fuel control process). In this case, the fuel control unit 54 determines the fuel flow rate at which the power generator's output GP becomes a value obtained by subtracting the power discharged from the secondary battery 23 from the required output DP. Consequently, the fuel control unit 54 makes a fuel flow rate lower than that of a case in which all the required output DP is secured by the power generator's output GP.

Next, the determination unit 52 determines whether or not the charge percentage SOC has reached the set low charge percentage (S45*b*). If the charge percentage SOC has not reached the set low charge percentage, the determination unit 52 waits until the charge percentage SOC reaches the set low charge percentage. When the determination unit 52 determines that the charge percentage SOC has reached the set low charge percentage, the second control unit 56 causes discharging of the secondary battery 23 by the second frequency converter 25 to be stopped (S46b). Then, as described above, the determination unit 52 issues an instruction to the fuel control unit 54 so that the power generator's output GP reaches the required output DP (S47).

Accordingly, the slow change process is completed. In the present embodiment, even when the required output DP becomes higher than the set high output, it is possible to minimize an increase in the flow rate of the fuel supplied to the combustor 12 and stably operate a fuel system, a system through which combustion gas flows, and the like. Also, in this slow change process, as long as the determination unit 52 does not give an instruction related to the fuel flow rate to the fuel control unit 54, the fuel control unit 54 determines a fuel flow rate according to the required output and indicates a degree of opening according to the fuel flow rate to the fuel adjustment valve 15 (S73: fuel control process).

When the determination unit 52 determines that the required output DP does not become the set high output in S40b, the reception unit 51 receives an air temperature forecast (S50: temperature forecast reception process), as shown in FIG. 8.

When the reception unit 51 receives the air temperature forecast, the determination unit 52 determines whether or not the charge percentage SOC estimated by the charge percentage estimation unit 53 is lower than the set low charge percentage (S51a: sixth determining process). When it is determined that the charge percentage SOC is lower than the set low charge percentage, the determination unit 52 determines whether or not the required output change rate dDP is negative (S52a: first determination process). When the determination unit 52 determines that the required output change rate dDP is not negative, the slow change process is terminated. Also, when it is determined that the required output change rate dDP is negative, the determination unit 52 determines whether or not the air temperature after X hours becomes higher than the first temperature (S53a: eighth determination process). A time after the X hours is, for example, that after 6 hours. Also, the first temperature is a temperature higher than a design temperature of the air suctioned by the compressed air and is, for example, 30° C. When the determination unit 52 determines that the air temperature after the X hours becomes higher than the first temperature, the reference change unit 58 increases the reference charge percentage SOCb (S54a: reference change process). Specifically, for example, a charge percentage SOC obtained by multiplying the reference charge percentage SOCb that is an initial value by 1.3 is set as a new reference charge percentage SOCb. When the reference change unit 58 increases the reference charge percentage SOCb, the second control unit 56 causes the secondary battery 23 to be charged by the second frequency converter 25 (S55a: second control process). On the other hand, if the determination unit 52 determines that the air temperature after the X hours does not become higher than the first temperature in S53a, the second control unit 56 causes the secondary battery 23 to be immediately charged by the second frequency converter 25 (S55a).

Next, the determination unit 52 determines whether or not the charge percentage SOC has reached the reference charge percentage SOCb (S56a). If the charge percentage SOC has not reached the reference charge percentage SOCb, the determination unit 52 waits until the charge percentage SOC reaches the reference charge percentage SOCb. When the determination unit 52 determines that the charge percentage SOC has reached the reference charge percentage SOCb, the second control unit 56 causes charging of the secondary battery 23 by the second frequency converter 25 to be stopped (S57a).

Next, the determination unit 52 determines whether or not the reference charge percentage SOCb is an initial value (S58). When the determination unit 52 determines that the reference charge percentage SOCb is not the initial value, the reference change unit 58 returns the reference charge percentage SOCb to the initial value. Accordingly, the slow change process is completed. Also, when the determination unit 52 determines that the reference charge percentage SOCb is the initial value, the slow change process is immediately terminated. In the present embodiment, when the change in the required output DP slowly decreases and the charge percentage SOC of the secondary battery 23 is low, the secondary battery 23 is charged with power from the power system 1.

When it is determined that the charge percentage SOC is not lower than the set low charge percentage in S51a, the determination unit 52 determines whether or not the charge percentage SOC is higher than the set high charge percentage (S51b: sixth determining process). When the determination unit 52 determines that the charge percentage SOC is not higher than the set high charge percentage, the slow change process is terminated. When it is determined that the charge percentage SOC is higher than the set high charge percentage, the determination unit 52 determines whether or not the required output change rate dDP is positive (S52b: first determination process). When the determination unit 52 determines that the required output change rate dDP is not positive, the slow change process is terminated. Also, when it is determined that the required output change rate dDP is positive, the determination unit 52 determines whether or not the air temperature after the X hours becomes lower than a second temperature (S53b: eighth determination process). This second temperature is a temperature lower than the design temperature of the air suctioned by the compressed air and is, for example, 10° C. When the determination unit 52 determines that the air temperature after the X hours is lower than the second temperature, the reference change unit 58 decreases the reference charge percentage SOCb (S54b: reference change process). Specifically, for example, a charge percentage SOC obtained by multiplying the reference charge percentage SOCb that is an initial value by 0.7 is set as a new reference charge percentage SOCb. When the reference change unit 58 decreases the reference charge percentage SOCb, the second control unit 56 causes power from the secondary battery 23 to be discharged by the second frequency converter 25 (S55b: second control process). On the other hand, when the determination unit 52 determines that the air temperature after the X hours does not become lower than the second temperature in S53b, the second control unit 56 causes power from the secondary battery 23 to be immediately discharged from the secondary battery 23 by the second frequency converter 25 (S55b).

Next, the determination unit 52 determines whether or not the charge percentage SOC has reached the reference charge percentage SOCb (S56b). If the charge percentage SOC has not reached the reference charge percentage SOCb, the determination unit 52 waits until the charge percentage SOC reaches the reference charge percentage SOCb. When the determination unit 52 determines that the charge percentage SOC has reached the reference charge percentage SOCb, the second control unit 56 causes discharging from the secondary battery 23 by the second frequency converter 25 to be stopped (S57b).

Next, the determination unit 52 determines whether or not the reference charge percentage SOCb is an initial value (S58). When the determination unit 52 determines that the reference charge percentage SOCb is not the initial value, the reference change unit 58 returns the reference charge percentage SOCb to the original initial value (S59). Accordingly, the slow change process is completed. Also, when the determination unit 52 determines that the reference charge percentage SOCb is the initial value, the slow change process is immediately terminated. In the present embodiment, when the change in the required output DP slowly increases and the charge percentage SOC of the secondary battery 23 is high, power is discharged from the secondary battery 23 to the power system 1.

Figure 9:
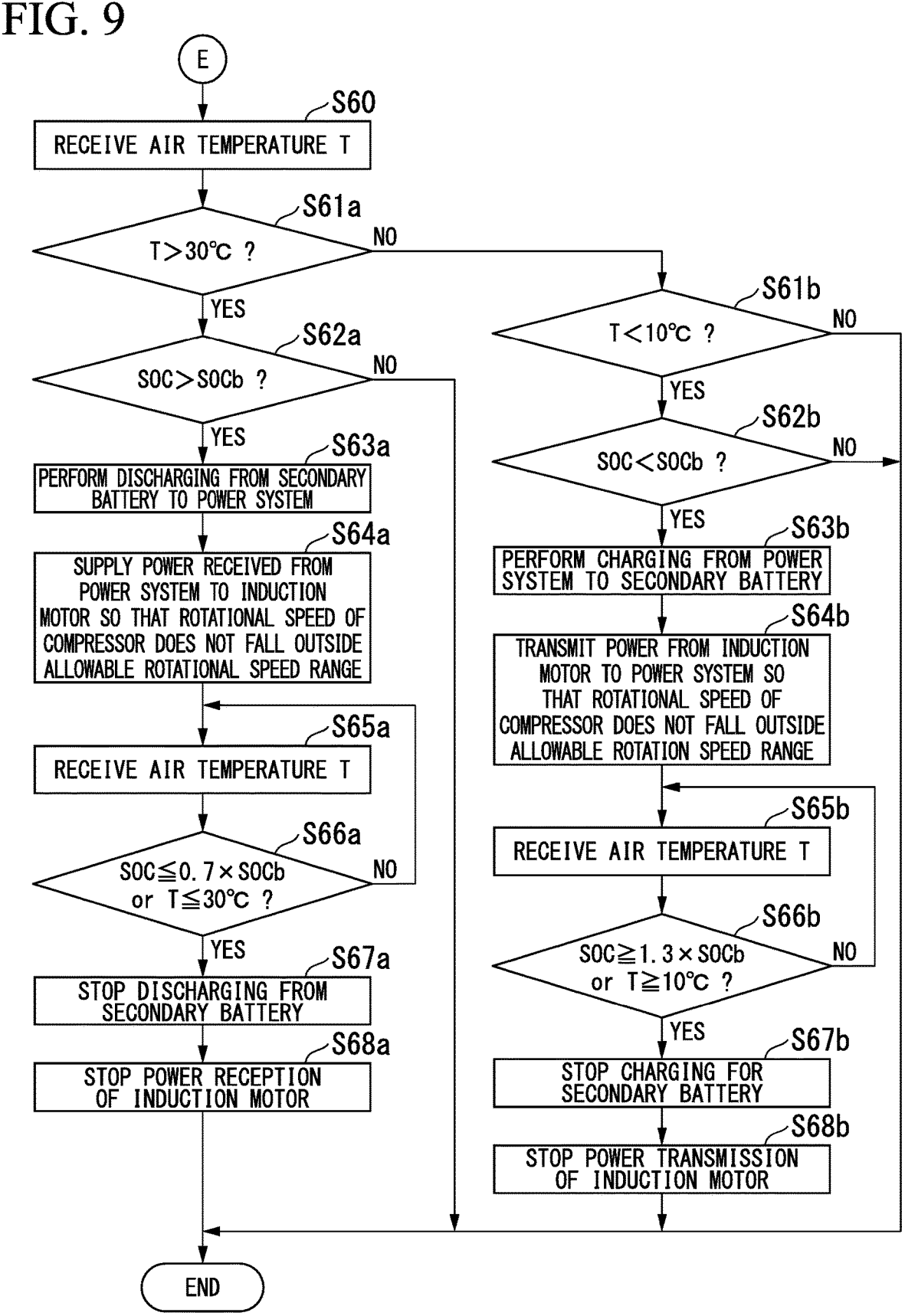
FIG. 9 is a flowchart (part 7) showing an operation of the control device according to an embodiment of the present invention.

Next, a constant output process will be described in accordance with the flowchart shown in FIG. 9. As described above, this constant output process is executed when it is determined that the change rate of the required output DP is 0 (the case of YES in S23).

In this constant output process, the reception unit 51 first receives the temperature of air detected by the thermometer 42, i.e., an air temperature T (S60: air temperature reception process). The determination unit 52 determines whether or not the air temperature T is higher than the first temperature (for example, 30° C.) (S61*a*: seventh determination process). When it is determined that the temperature T is higher than the first temperature, the determination unit 52 determines whether or not the charge percentage SOC of the secondary battery 23 is higher than the reference charge percentage SOCb (S62*a*: sixth determination process). When the determination unit 52 determines that the charge percentage SOC of the secondary battery 23 is not higher than the reference charge percentage SOCb, the constant output process is terminated. Also, when the determination unit 52 determines that the charge percentage SOC of the secondary battery 23 is higher than the reference charge percentage SOCb, the second control unit 56 causes power to be discharged from the secondary battery 23 to the power system 1 by the second frequency converter 25 (S63*a*). Further, when the determination unit 52 determines that the charge percentage SOC of the secondary battery 23 is higher than the reference charge percentage SOCb, the first control unit 55 causes power received from the power system 1 to be supplied to the induction motor 22 by the first frequency converter 24 (S64*b*). In this case, the first control unit 55 causes the power to be supplied to the induction motor 22 by the first frequency converter so that the rotational speed of the first rotor 17 (=the rotational speeds of the induction motor 22 and the compressor 11) falls outside the allowable rotational speed range. Basically, the rotational speed of the first rotor 17 (=the rotational speeds of the induction motor 22 and the compressor 11) tends to increase when power is supplied to the induction motor 22. Thus, in this case, the first control unit 55 causes power to be supplied to the induction motor 22 by the first frequency converter 24 so that the rotational speed of the first rotor 17 (=the rotational speeds of the induction motor 22 and the compressor 11) is not higher than the allowable upper limit rotational speed RpH.

Next, the reception unit 51 receives the temperature T detected by the thermometer 42 (S65*a*). The determination unit 52 determines whether the temperature T is lower than or equal to the first temperature (for example, 30° C.) or whether the charge percentage SOC is lower than or equal to the set low charge percentage (for example, a charge percentage SOC that is 0.7 times the reference charge percentage SOCb) (S66*a*). When the air temperature T is not lower than or equal to the first temperature (for example, 30° C.) and the charge percentage SOC is not lower than the set low charge percentage, the process returns to S65*a*. Also, when the air temperature T is lower than or equal to the first temperature (for example, 30° C.) or when the charge percentage SOC is lower than or equal to the set low charge percentage, the second control unit 56 causes discharging from the secondary battery 23 to the power system 1 by the second frequency converter 25 to be stopped (S67*a*). Further, the first control unit 55 causes the supply of the power received from the power system 1 to the induction motor 22 by the first frequency converter 24 to be stopped (S68*a*).

Accordingly, the constant output process is completed. Also, when the constant output process is executed, the fuel control unit 54 determines the fuel flow rate according to the required output DP and indicates a degree of opening according to the fuel flow rate to the fuel adjustment valve 15 as described with reference to FIG. 4 (S73: fuel control process).

When the temperature of the air suctioned by the compressor 11 is high, the gas turbine output, i.e., the power generator's output GP, decreases because the mass flow rate of the air flowing into the gas turbine decreases. In contrast, when the temperature of the air suctioned by the compressor 11 is low, the gas turbine output, i.e., the power generator's output GP, increases because the mass flow rate of the air flowing into the gas turbine increases.

Therefore, in the present embodiment, when the temperature of the air suctioned by the compressor 11, i.e., the air temperature T, is high, the power of the secondary battery 23 is discharged, the induction motor 22 is driven using this power, and driving of the compressor 11 is assisted by this induction motor 22. Consequently, in the present embodiment, even when the temperature of the air suctioned by the compressor 11 is high, it is possible to minimize a decrease in the power generator's output GP.

Also, in the present embodiment, when it is predicted that the air temperature after X hours will be higher than the first temperature in S53*a* and S54*a* of the slow change process (see FIG. 8), the reference charge percentage SOCb of the secondary battery 23 is increased and the secondary battery 23 is charged by the second frequency converter 25 so that the charge percentage SOC of the secondary battery 23 becomes the reference charge percentage SOCb. Consequently, in the present embodiment, when the temperature of the air suctioned by the compressor 11 is high, the secondary battery 23 is discharged, and the driving of the compressor 11 is assisted by the induction motor 22, the charge percentage SOC of the secondary battery 23 can be increased in advance. Thus, the driving of the compressor 11 can be assisted by the induction motor 22 over a long period of time.

When it is determined that the air temperature T is not higher than the first temperature (for example, 30° C.) in S61*a*, the determination unit 52 determines whether or not the air temperature T is lower than the second temperature (for example, 10° C.) (S61*b*: seventh determination process). When the determination unit 52 determines that the air temperature T is not lower than the second temperature, the constant output process is terminated. When it is determined that the temperature T is lower than the second temperature, the determination unit 52 determines whether or not the charge percentage SOC of the secondary battery 23 is lower than the reference charge percentage SOCb (S62*b*: sixth determination process). When the determination unit 52 determines that the charge percentage SOC of the secondary battery 23 is not lower than the reference charge percentage SOCb, the constant output process is terminated. Also, when the determination unit 52 determines that the charge percentage SOC of the secondary battery 23 is lower than the reference charge percentage SOCb, the second control unit 56 causes power received from the power system 1 to be supplied to the secondary battery 23 by the second frequency converter 25 (S63b). Further, when the determination unit 52 determines that the charge percentage SOC of the secondary battery 23 is lower than the reference charge percentage SOCb, the first control unit 55 causes power to be transmitted from the induction motor 22 to the power system 1 by the first frequency converter 24 (S64b). In this case, the first control unit 55 causes the power from the induction motor 22 to be transmitted to the power system 1 by the first frequency converter 24 so that the rotational speed of the first rotor 17 (=the rotational speeds of the induction motor 22 and the compressor 11) does not fall outside the allowable rotational speed range. Basically, the rotational speed of the first rotor 17 (=the rotational speeds of the induction motor 22 and the compressor 11) tends to decrease when power from the induction motor 22 is transmitted to the power system 1. Thus, in this case, the first control unit 55 causes power from the induction motor 22 to be transmitted to the power system 1 by the first frequency converter 24 so that the rotational speed of the first rotor 17 (=the rotational speeds of the induction motor 22 and the compressor 11) does not become lower than the allowable lower limit rotational speed RpL.

Next, the reception unit 51 receives the temperature T detected by the thermometer 42 (S65b). The determination unit 52 determines whether the temperature T is higher than or equal to the second temperature (for example, 10° C.) or the charge percentage SOC is higher than or equal to the set high charge percentage (for example, a charge percentage SOC that is 1.3 times the reference charge percentage SOCb) (S66b). When the air temperature T is not higher than or equal to the second temperature and the charge percentage SOC is not higher than or equal to the set high charge percentage, the process returns to S65b. Also, when the air temperature T is higher than or equal to the second temperature or when the charge percentage SOC is higher than or equal to the set high charge percentage, the second control unit 56 causes charging for the secondary battery 23 by the second frequency converter 25 to be stopped (S67b). Further, the first control unit 55 causes power transmission from the induction motor 22 to the power system 1 by the first frequency converter 24 to be stopped (S68b).

Accordingly, the constant output process is completed. In the present embodiment, when the temperature of the air suctioned by the compressor 11, i.e., the air temperature T, is low, the induction motor 22 is driven by the compressor 11, i.e., the induction motor 22 assists the driving of the compressor 11 to the negative side, and power from the induction motor 22 is transmitted to the power system 1 to charge the secondary battery 23 with the power. Consequently, in the present embodiment, even when the temperature of the air suctioned by the compressor 11 is low, it is possible to minimize an increase in the power generator's output GP.

Also, in the present embodiment, when it is predicted that the air temperature after X hours will be lower than the second temperature in S53b and S54b (see FIG. 8) of the slow change process, the reference charge percentage SOCb of the secondary battery 23 is lowered and the secondary battery 23 is discharged by the second frequency converter 25 so that the charge percentage SOC of the secondary battery 23 becomes the reference charge percentage SOCb. Consequently, in the present embodiment, when the temperature of the air suctioned by the compressor 11 decreases, an amount of charge for the secondary battery 23 can be increased in S63b (see FIG. 9).

As described above, in the present embodiment, it is possible to improve the output conformability of a two-shaft gas turbine power generating facility with respect to a change in a required output DP and minimize deterioration in the performance of the secondary battery 23.

Also, in the present embodiment, the induction motor 22 is electrically connected to the power system 1 via the sub-power path 34 and the main power path 31. Also, in the present embodiment, the secondary battery 23 is electrically connected to the power system 1 via the charging and discharging path 37 and the main power path 31. However, the induction motor 22 may be electrically connected to the power system 1 via the sub-power path 34 without involving the main power path 31. Also, the secondary battery 23 may be electrically connected to the power system 1 via the charging and discharging path 37 without involving the main power path 31.

INDUSTRIAL APPLICABILITY

According to an aspect of the present invention, it is possible to improve the output conformability of a two-shaft gas turbine power generating facility with respect to a change in a required output and extend the lifespan of a secondary battery by minimizing deterioration in the performance of the secondary battery.

REFERENCE SIGNS LIST

1 Power system
10 Two-shaft gas turbine
11 Compressor
11c Compressor casing
11r Compressor rotor
12 Combustor
13 High-pressure turbine
13c High-pressure turbine casing
13r High-pressure turbine rotor
14 Low-pressure turbine
14c Low-pressure turbine casing
14r Low-pressure turbine rotor
15 Fuel adjustment valve
16 Fuel line
17 First rotor
18 Second rotor
21 Power generator
21c Power generator casing
21r Power generator rotor
22 Induction motor
22c Motor casing
22r Motor rotor
23 Secondary battery
24 First frequency converter
25 Second frequency converter
31 Main power path
34 Sub-power path
37 Charging and discharging path
41 Rotational speed meter
42 Thermometer
43 Ammeter
50 Control device
51 Reception unit 52 Determination unit (first determination unit, second determination unit, third determination unit, fourth determination unit, fifth determination unit, sixth determination unit, seventh determination unit, and eighth determination unit)
53 Charge percentage estimation unit
54 Fuel control unit
55 First control unit
56 Second control unit
57 Storage unit
58 Reference change unit

The invention claimed is:

1. A two-shaft gas turbine power generating facility, comprising:
    a compressor having a compressor rotor and configured to generate compressed air by compressing air during rotation of the compressor rotor;
    a combustor configured to combust fuel in the compressed air and generate a combustion gas;
    a fuel adjustment valve configured to adjust a flow rate of the fuel to be supplied to the combustor;
    a high-pressure turbine having a high-pressure turbine rotor mechanically connected to the compressor rotor, the high-pressure turbine rotor being rotated by the combustion gas;
    a low-pressure turbine having a low-pressure turbine rotor disconnected from the high-pressure turbine rotor, the low-pressure turbine rotor being rotated by the combustion gas discharged from the high-pressure turbine;
    a power generator configured to generate power in rotation of the low-pressure turbine rotor and electrically connected to a power system through which alternating current (AC) power flows;
    an induction motor mechanically connected to the compressor rotor and electrically connected to the power system in parallel to the power generator;
    a first frequency convertor provided between the induction motor and the power system in an electrical connection relationship, configured to control power transmission and reception between the induction motor and the power system, convert a frequency of power from the induction motor into a frequency of the power system when power from the induction motor is transmitted to a power system side, and convert a frequency of power of the power system into a frequency of the induction motor when power from the power system side is received and supplied to the induction motor;
    a secondary battery electrically connected to the power system in parallel to the power generator and the induction motor;
    a second frequency converter provided between the secondary battery and the power system in an electrical connection relationship and configured to control charging and discharging of the secondary battery, convert direct current (DC) power from the secondary battery into AC power according to a frequency of the power system when the DC power from the secondary battery is discharged to the power system, and convert AC power of the power system into DC power when the secondary battery is charged with AC power from the power system; and
    a control device configured to control the fuel adjustment valve, the first frequency converter, and the second frequency converter,
    wherein the control device includes
        a reception unit configured to externally receive a required output;
        a first determination unit configured to determine whether an absolute value of a required output change rate that is an amount of change per unit time of the required output is greater than an absolute value of a maximum output change rate that is a maximum change amount per unit time of an output of the power generator;
        a second determination unit configured to determine whether or not a predetermined condition has been satisfied after the first determination unit determines that the absolute value of the required output change rate is greater than the absolute value of the maximum output change rate;
        a fuel control unit configured to control a degree of opening of the fuel adjustment valve in accordance with a change in the required output and control the degree of opening of the fuel adjustment valve so that the output of the power generator changes at the maximum output change rate when the first determination unit determines that the absolute value of the required output change rate is greater than the absolute value of the maximum output change rate;
        a first control unit configured to cause power to be transmitted and received between the induction motor and the power system by the first frequency converter when the first determination unit determines that the absolute value of the required output change rate is greater than the absolute value of the maximum output change rate; and
        a second control unit configured to cause the secondary battery to be discharged by the second frequency converter if power is transmitted by the induction motor and cause the secondary battery to be charged by the second frequency converter if power is received by the induction motor when the second determination unit determines that the predetermined condition has been satisfied, and
    wherein the predetermined condition is that power to be transmitted and received by the induction motor becomes maximum allowable power determined for the induction motor or a rotational speed of the compressor rotor becomes a limit in a switching rotational speed range narrower than an allowable rotational speed range of the compressor.

2. The two-shaft gas turbine power generating facility according to claim 1, wherein the first control unit increases an amount of power to be transmitted to and received from the induction motor by the first frequency converter until the second determination unit determines that the predetermined condition has been satisfied after the first determination unit determines that the absolute value of the required output change rate is greater than the absolute value of the maximum output change rate and decreases an amount of power to be transmitted to and received from the induction motor by the first frequency converter when the second determination unit determines that the predetermined condition has been satisfied.

3. The two-shaft gas turbine power generating facility according to claim 1,
    wherein the control device includes a third determination unit configured to determine whether or not the rotational speed of the compressor rotor has reached the limit in the allowable rotational speed range, and
    wherein the first control unit is configured to cause power transmission and reception to and from the induction motor by the first frequency converter to be stopped when the third determination unit determines that the rotational speed of the compressor rotor has reached the limit in the allowable rotational speed range after the power transmission and reception to and from the induction motor are started by the first frequency converter.

4. The two-shaft gas turbine power generating facility according to claim 1,
wherein the control device includes
a fourth determination unit configured to determine whether or not the rotational speed of the compressor has returned to an immediately previous rotational speed at which power transmission and reception to and from the induction motor are started after the power transmission and reception to and from the induction motor are started by the first frequency converter; and
a fifth determination unit configured to determine whether or not a positive or negative sign of a required output change rate of a previously required output is opposite to a positive or negative sign of a required output change rate of a newly required output after the first determination unit determines that an absolute value of the required output change rate of the newly required output is greater than an absolute value of the maximum output change rate, wherein the newly required output is received by the reception unit after the power transmission and reception to and from the induction motor are started by the first frequency converter and before the fourth determination unit determines that the rotational speed of the compressor has returned to the immediately previous rotational speed at which the power transmission and reception to and from the induction motor are started,
wherein, if the fifth determination unit determines that the positive or negative sign of the required output change rate of the previously required output is the same as the positive or negative sign of the required output change rate of the newly required output,
the fuel control unit configured to control the degree of opening of the fuel adjustment valve so that the output of the power generator changes at the maximum output change rate in accordance with the newly required output,
the first control unit configured to cause power transmission and reception to continue between the induction motor and the power system in accordance with the previously required output by the first frequency converter or cause the power transmission and reception to be stopped if power is transmitted and received between the induction motor and the power system in accordance with the previously required output, and
the second control unit configured to cause charging and discharging of the secondary battery according to the previously required output by the second frequency converter to be continued or cause the charging and discharging to be stopped if the secondary battery is charged and discharged in accordance with the previously required output.

5. The two-shaft gas turbine power generating facility according to claim 4, wherein, if the fifth determination unit determines that the positive or negative sign of the required output change rate of the previously required output is opposite to the positive or negative sign of the required output change rate of the newly required output,
the fuel control unit configured to control the degree of opening of the fuel adjustment valve so that the output of the power generator changes at the maximum output change rate in accordance with the newly required output,
the first control unit configured to cause power transmission and reception to be started between the induction motor and the power system in accordance with the previously required output by the first frequency converter, and
the second control unit configured to cause the secondary battery to be discharged by the second frequency converter if power is transmitted by the induction motor and cause the secondary battery to be charged by the second frequency converter if power is received by the induction motor when the second determination unit determines that the predetermined condition has been satisfied.

6. The two-shaft gas turbine power generating facility according to claim 1,
wherein the control device includes
a charge percentage estimation unit configured to estimate a charge percentage of the secondary battery; and
a sixth determination unit configured to determine whether the charge percentage of the secondary battery estimated by the charge percentage estimation unit is lower than a set low charge percentage lower than a reference charge percentage and is higher than a set high charge percentage higher than the reference charge percentage, and
wherein the second control unit configured to cause the secondary battery to be charged by the second frequency converter when the sixth determination unit determines that the charge percentage of the secondary battery is lower than the set low charge percentage and the first determination unit determines that a negative required output change rate is higher than a negative maximum output change rate and cause the secondary battery to be discharged by the second frequency converter when the sixth determination unit determines that the charge percentage of the secondary battery is higher than the set high charge percentage and the first determination unit determines that a positive required output change rate is lower than a positive maximum output change rate.

7. The two-shaft gas turbine power generating facility according to claim 6,
wherein the reception unit configured to receive a forecast of a temperature of air suctioned by the compressor, and
wherein the control device includes
an eighth determination unit configured to determine whether the forecast temperature of the air suctioned by the compressor after a predetermined time is higher than a first temperature higher than a design temperature of the air suctioned by the compressor and whether the forecast temperature of the air suctioned by the compressor after the predetermined time is lower than a second temperature lower than the design temperature; and
a reference change unit configured to increase the reference charge percentage when the eighth determination unit determines that the forecast temperature of the air suctioned by the compressor after the predetermined time is higher than the first temperature and decrease the reference charge percentage when the eighth determination unit determines that the forecast temperature of the air suctioned by the compressor after the predetermined time is lower than the second temperature.

8. The two-shaft gas turbine power generating facility according to claim 6,
wherein the sixth determination unit configured to determine whether the charge percentage of the secondary battery estimated by the charge percentage estimation unit is higher than the set low charge percentage and is lower than the set high charge percentage,
wherein the control device includes a ninth determination unit configured to determine whether the required output is lower than a set low output lower than a rated output related to the power generator and whether the required output is lower than the rated output and is higher than a set high output higher than the set low output,
wherein, when the ninth determination unit determines that the required output is lower than the set low output, the sixth determination unit determines that the charge percentage of the secondary battery is lower than the set high charge percentage, and the first determination unit determines that a negative required output change rate is higher than a negative maximum output change rate, the second control unit configured to cause the secondary battery to be charged by the second frequency converter and the fuel control unit configured to control the degree of opening of the fuel adjustment valve so that the output of the power generator becomes a value obtained by summing the required output and power with which the secondary battery is charged by the second frequency converter, and
wherein, when the ninth determination unit determines that the required output is higher than the set low output, the sixth determination unit determines that the charge percentage of the secondary battery is higher than the set low charge percentage, and the first determination unit determines that a positive required output change rate is lower than a positive maximum output change rate, the second control unit configured to cause the secondary battery to be discharged by the second frequency converter and the fuel control unit configured to control the degree of opening of the fuel adjustment valve so that the output of the power generator becomes a value obtained by subtracting power with which the secondary battery is discharged by the second frequency converter from the required output.

9. A control method for a two-shaft gas turbine power generating facility including
a compressor having a compressor rotor and configured to generate compressed air by compressing air during rotation of the compressor rotor;
a combustor configured to combust fuel in the compressed air and generate a combustion gas;
a fuel adjustment valve configured to adjust a flow rate of the fuel to be supplied to the combustor;
a high-pressure turbine having a high-pressure turbine rotor mechanically connected to the compressor rotor, the high-pressure turbine rotor being rotated by the combustion gas;
a low-pressure turbine having a low-pressure turbine rotor disconnected from the high-pressure turbine rotor, the low-pressure turbine rotor being rotated by the combustion gas discharged from the high-pressure turbine;
a power generator configured to generate power in rotation of the low-pressure turbine rotor and electrically connected to a power system through which AC power flows;
an induction motor mechanically connected to the compressor rotor and electrically connected to the power system in parallel to the power generator;
a first frequency convertor provided between the induction motor and the power system in an electrical connection relationship, configured to control power transmission and reception between the induction motor and the power system, convert a frequency of power from the induction motor into a frequency of the power system when power from the induction motor is transmitted to a power system side, and convert a frequency of power of the power system into a frequency of the induction motor when power from the power system side is received and supplied to the induction motor;
a secondary battery electrically connected to the power system in parallel to the power generator and the induction motor; and
a second frequency converter provided between the secondary battery and the power system in an electrical connection relationship and configured to control charging and discharging of the secondary battery, convert DC power from the secondary battery into AC power according to a frequency of the power system when the DC power from the secondary battery is discharged to the power system, and convert AC power of the power system into DC power when the secondary battery is charged with AC power from the power system, the control method comprising:
a reception process of externally receiving a required output;
a first determination process of determining whether an absolute value of a required output change rate that is an amount of change per unit time of the required output is greater than an absolute value of a maximum output change rate that is a maximum change amount per unit time of an output of the power generator;
a second determination process of determining whether or not a predetermined condition has been satisfied after it is determined that the absolute value of the required output change rate is greater than the absolute value of the maximum output change rate in the first determination process;
a fuel control process of controlling a degree of opening of the fuel adjustment valve in accordance with a change in the required output and controlling the degree of opening of the fuel adjustment valve so that the output of the power generator changes at the maximum output change rate when it is determined that the absolute value of the required output change rate is greater than the absolute value of the maximum output change rate in the first determination process;
a first control process of causing power transmission and reception between the induction motor and the power system by the first frequency converter to be started when it is determined that the absolute value of the required output change rate is greater than the absolute value of the maximum output change rate in the first determination process; and
a second control process of causing the secondary battery to be discharged by the second frequency converter if power is transmitted by the induction motor and causing the secondary battery to be charged by the second frequency converter if power is received by the induction motor when it is determined that the predetermined condition has been satisfied in the second determination process, wherein the predetermined condition is that power to be transmitted and received by the induction motor becomes maximum allowable power determined for the induction motor or a rotational speed of the compressor rotor becomes a limit in a switching rotational speed range narrower than an allowable rotational speed range of the compressor rotor.

10. The control method for the two-shaft gas turbine power generating facility according to claim 9, wherein the first control process includes increasing an amount of power to be transmitted to and received from the induction motor by the first frequency converter until it is determined that the predetermined condition has been satisfied in the second determination process after it is determined that the absolute value of the required output change rate is greater than the absolute value of the maximum output change rate in the first determination process and decreasing an amount of power to be transmitted to and received from the induction motor by the first frequency converter when it is determined that the predetermined condition has been satisfied in the second determination process.

11. The control method for the two-shaft gas turbine power generating facility according to claim 9, comprising:
a third determination process of determining whether or not the rotational speed of the compressor rotor has reached the limit in the allowable rotational speed range, wherein power transmission and reception to and from the induction motor by the first frequency converter are stopped in the first control process when it is determined that the rotational speed of the compressor rotor has reached the limit in the allowable rotational speed range in the third determination process after the power transmission and reception to and from the induction motor are started by the first frequency converter.

12. The control method for the two-shaft gas turbine power generating facility according to any claim 9, comprising:
a charge percentage estimation process of estimating a charge percentage of the secondary battery; and
a sixth determination process of determining whether the charge percentage of the secondary battery estimated in the charge percentage estimation process is lower than a set low charge percentage lower than a reference charge percentage and is higher than a set high charge percentage higher than the reference charge percentage,
wherein the second control process includes causing the secondary battery to be charged by the second frequency converter when it is determined that the charge percentage of the secondary battery is lower than the set low charge percentage in the sixth determination process and it is determined that a negative required output change rate is higher than a negative maximum output change rate in the first determination process and causing the secondary battery to be discharged by the second frequency converter when it is determined that the charge percentage of the secondary battery is higher than the set high charge percentage in the sixth determination process and it is determined that a positive required output change rate is lower than a positive maximum output change rate in the first determination process.

13. The control method for the two-shaft gas turbine power generating facility according to claim 12,
wherein a forecast of a temperature of air suctioned by the compressor is received in the reception process, and
wherein the control method comprises
an eighth determination process of determining whether the forecast temperature of the air suctioned by the compressor after a predetermined time is higher than a first temperature higher than a design temperature of the air suctioned by the compressor and whether the forecast temperature of the air suctioned by the compressor after the predetermined time is lower than a second temperature lower than the design temperature; and
a reference change process of increasing the reference charge percentage when it is determined that the forecast temperature of the air suctioned by the compressor after the predetermined time is higher than the first temperature in the eighth determination process and decreasing the reference charge percentage when it is determined that the forecast temperature of the air suctioned by the compressor after the predetermined time is lower than the second temperature in the eighth determination process.

14. The control method for the two-shaft gas turbine power generating facility according to claim 12,
wherein it is determined whether the charge percentage of the secondary battery estimated in the charge percentage estimation process is higher than the set low charge percentage and is lower than the set high charge percentage in the sixth determination process,
wherein the control method comprises a ninth determination process of determining whether the required output is lower than a set low output lower than a rated output related to the power generator and whether the required output is lower than the rated output and is higher than a set high output higher than the set low output;
wherein, when it is determined that the required output is lower than the set low output in the ninth determination process, it is determined that the charge percentage of the secondary battery is lower than the set high charge percentage in the sixth determination process, and it is determined that a negative required output change rate is higher than a negative maximum output change rate in the first determination process, the secondary battery is charged by the second frequency converter in the second control process and the degree of opening of the fuel adjustment valve is controlled so that the output of the power generator becomes a value obtained by summing the required output and power with which the secondary battery is charged by the second frequency converter in the fuel control process, and
wherein, when it is determined that the required output is higher than the set low output in the ninth determination process, it is determined that the charge percentage of the secondary battery is higher than the set low charge percentage in the sixth determination process, and it is determined that a positive required output change rate is lower than a positive maximum output change rate in the first determination process, the secondary battery is discharged by the second frequency converter in the second control process and the degree of opening of the fuel adjustment valve is controlled so that the output of the power generator becomes a value obtained by subtracting power with which the secondary battery is discharged by the second frequency converter from the required output in the fuel control process.

* * * * *